US009106711B2

(12) United States Patent
Baillargeon

(10) Patent No.: US 9,106,711 B2
(45) Date of Patent: Aug. 11, 2015

(54) MINIMIZING MAPPING AND SIGNALING FOR DATA PATH AGGREGATION

(75) Inventor: Steve Baillargeon, Gatineau (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 280 days.

(21) Appl. No.: 13/602,940

(22) Filed: Sep. 4, 2012

(65) Prior Publication Data

US 2014/0064246 A1 Mar. 6, 2014

(51) Int. Cl.
*H04L 29/12* (2006.01)
*H04W 76/02* (2009.01)

(52) U.S. Cl.
CPC ......... *H04L 61/2592* (2013.01); *H04W 76/022* (2013.01)

(58) Field of Classification Search
None
See application file for complete search history.

(56) References Cited

U.S. PATENT DOCUMENTS

| 7,843,927 | B1* | 11/2010 | Grosser et al. | 370/392 |
|---|---|---|---|---|
| 2001/0032201 | A1* | 10/2001 | Lee et al. | 707/3 |
| 2002/0059197 | A1* | 5/2002 | Hunter et al. | 707/3 |
| 2004/0073715 | A1* | 4/2004 | Folkes et al. | 709/250 |
| 2009/0010933 | A1 | 1/2009 | Davis-Smyth et al. | |
| 2009/0047947 | A1 | 2/2009 | Giaretta et al. | |
| 2009/0059848 | A1* | 3/2009 | Khetawat et al. | 370/328 |
| 2009/0285179 | A1 | 11/2009 | Jones et al. | |
| 2010/0254277 | A1* | 10/2010 | Nylander et al. | 370/252 |
| 2011/0200007 | A1 | 8/2011 | Qiang | |
| 2012/0236708 | A1* | 9/2012 | Kompella et al. | 370/220 |

OTHER PUBLICATIONS

PCT Invitation to Pay Additional Fees, Form PCT/ISA/206, for International Application No. PCT/IB2013/056788; International Filing Date: Aug. 21, 2013 consisting of 6-pages.
International Search Report and Written Opinion dated Mar. 18, 2014 for International Application No. PCT/IB2013/056788; International Filing Date: Aug. 21, 2013 consisting of 13-pages.
"3rd Generation Partnership Project; Universal Mobile Telecommunications System (UMTS); LTE; General Packet Radio System (GPRS); Tunnelling Protocol User lane (GTPv1-U); (Release 9)" 3GPP TS 29.281 V9.2.0 (Apr. 2010), consisting of 26 pages.
"3rd Generation Partnership Project; Technical Specification Group Radio Access Network; Evolved Universal Terrestrial Radio Access Network (E-UTRAN); X2 signalling transport; (Release 10)" 3GPP TS 36.422 V10.1.0 (Jun. 2011) consisting of 8-pages.
"3rd Generation Partnership Project; Technical Specification Group Core Network and Terminals; General Packet Radio Service (GPRS); GPRS Tunnelling Protocol (GTP); across the Gn and Gp interface; (Release 11)" 3GPP TS 29.060 V11.3.0 (Jun. 2012) consisting of 174-pages.

(Continued)

*Primary Examiner* — Brian Roberts
(74) *Attorney, Agent, or Firm* — Christopher & Weisberg, P.A.

(57) ABSTRACT

A method and system for transporting packets between an access node and a core node via a proxy node. The access node has an access node address, the core node has a core node address, and the proxy node has a proxy node address. A first packet for transmission to the core node is received from the access node. The first packet includes a first source address field including the access node address and a first destination address field including the core node address. An uplink static mapping entry with a longest address prefix matching the access node address in the first source address field is selected. The uplink static mapping entry is associated with the proxy node address. The access node address in the first source address field is replaced with the proxy node address associated with the uplink static mapping entry.

22 Claims, 10 Drawing Sheets

(56) References Cited

OTHER PUBLICATIONS

"3rd Generation Partnership Project; Technical Specification Group Radio Access Network; Evolved Universal Terrestrial Radio Access Network (E-UTRAN), S1 Application Protocol (S1AP); (Release 11)" 3GPP TS 36.413 v11.0.0 (Jun. 2012) consisting of 258 pages.

"3rd Generation Partnership Project; Technical Specification Group Radio Access Network; Evolved Universal Terrestrial Radio Access Network (E-UTRA) and Evolved Universal Terrestrial Radio Access Network (E-UTRAN); Overall description; Stage 2; (Release 11)" 3GPP TS 36.300 V11.2.0 (Jun. 2012) consisting of 201-pages.

* cited by examiner

MINIMIZING MAPPING AND SIGNALING FOR DATA PATH AGGREGATION

TECHNICAL FIELD

The present invention relates to network communication, and in particular to minimizing mapping and signaling for data path aggregation.

BACKGROUND

General Packet Radio Service ("GPRS") is a standard for wireless communications that supports a wide range of bandwidths. In GPRS packet-based services, the communication channels are shared on an as-needed basis rather than being dedicated to only one user at a time. As such, the GPRS standard is a best-effort service on the Second Generation ("2G") and Third Generation ("3G") wireless cellular communication systems for mobile communications.

The GPRS Tunneling Protocol ("GTP") is a group of Internet Protocol ("IP") based communications protocols used to carry GPRS within, for example, Global System for Mobile Communication ("GMS"), Universal Mobile Telecommunications System ("UMTS") and Long Term Evolution ("LTE") networks. GTP can be decomposed into the GTP control plane protocol ("GTP-C") used to carry tunnel establishment signals, and the GTP user plane protocol ("GTP-U") used to carry encapsulated data-related signals.

A proxy node may be a GTP-U node that supports one or more GTP-U endpoints, which are also known as GTP-U interfaces. Each GTP-U endpoint is configured with an Internet Protocol ("IP") address with UDP socket 2152 that identifies a source and/or destination for GTP-U data packets. A pair of GTP-U endpoints between two GTP-U nodes is known as a GTP-U data path. Each GTP-U data path has one or more GTP-U tunnels. GTP-U tunnels carry GTP-U data packets (also known as G-PDUs) between a pair of GTP-U tunnel endpoints. A tunnel endpoint is identified by a tunnel identifier, e.g., tunnel endpoint identifier ("TEID"). A TEID identifies a unicast GTP-U tunnel endpoint in the receiving GTP-U node for a given GTP-U endpoint. The TEID is included in a GTP header of a GTP-U packet.

Each tunnel between two GTP-U endpoints is established via control plane procedures defined in protocols such as GTP-C, Radio Access Network Application Part ("RANAP"), S1-Application Protocol ("S1-AP") and X2 Application Protocol ("X2-AP"). The control functions for GTP-U resource allocation and tunnel setup are performed by the GTP Control Plane Entity of the GTP-U node. The transmission and reception functions for GTP-U packets are performed by the GTP Data Plane Entity of the GTP-U node.

The receiving end side of a unicast GTP tunnel, i.e., the receiving node, locally assigns the GTP-U node IP address and TEID value that the transmitting side, i.e., the transmitting node, has to use. The IP addresses and TEID values are exchanged between tunnel endpoints using control plane messaging (GTP Control Plane). A TEID of zero ("0") is reserved for GTP-U signaling messages. G-PDUs are carried with a TEID other than zero.

A network controller can be used as a gateway or proxy acting as an intermediary between a larger set of GTP-U access nodes and a smaller set of GTP-U code nodes. The network controller performs the relay or mapping (translation) functions between a larger and smaller set of GTP-U paths for uplink and downlink G-PDUs. While the $3^{rd}$ Generation Partnership Project ("3GPP") standard specification mentions using a network controller, the specification does not state how a network controller, such as a Home Evolved Node B ("eNB") Gateway, terminates the GTP-U tunnels, or how the G-PDUs are relayed between the larger and smaller sets of GTP-U paths.

A proposed approach for supporting large number of data paths in an integrated communication system describes using a network controller for mapping G-PDUs between the larger and smaller set of GTP-U paths. The proposed approach defines a network controller responsible for interpreting or intercepting GTP-related signaling procedures and control messages between the GTP-U access nodes and the GTP-U core nodes. Each subscriber associated signaling procedure requesting the addition of a subscriber GTP-U tunnel creates individual mapping entries in a mapping table of the network controller. The individual mapping entries are used for mapping inbound and outbound traffic based on the GTP-U node IP address and the TEID.

However, this approach is limited to wireless communication areas that support a limited number of subscribers with limited mobility, where each GTP-U access node is more or less independent from other GTP-U access nodes located in the same wireless communication area. For instance, this proposed approach results in a mapping table with a number of mapping entries that is directly proportional to the number of GTP-U tunnels. The size of the mapping table is a limitation given that, as the number of subscribers grows in a wireless communication area, the mapping table in the network controller becomes very large. A large mapping table makes it difficult to perform simple and efficient table lookups for each individual inbound and outbound GTP-U packet.

Further, each mapping entry in the mapping table has to be individually managed through a signaling procedure. The more mapping entries a mapping table has, the more procedures would need to be performed. In fact, every time a GTP-U tunnel is added due to subscriber activity and every time a GTP-U tunnel is removed due to user inactivity, the network controller performs a number of internal control procedures to update the mapping table. The central processing unit ("CPU") cycles associated with such signaling and control procedures can become a significant load for the network controller as the number of subscribers grows in a wireless communication area.

Moreover, subscriber mobility between two GTP-U access nodes in a wireless communication area is not transparent to the core network. Using existing signaling procedures to update the mapping table causes undesirable signaling load on the GTP control plane entity of the core network during handovers.

SUMMARY

The present invention advantageously provides a method and system for minimizing data path aggregation in a communication network. In accordance with one aspect, a method for transporting packets between an access node and a core node via a proxy node is provided. The access node has an access node address, the core node has a core node address, and the proxy node has a proxy node address. A first packet for transmission to the core node is received from the access node. The first packet includes a first source address field including the access node address and a first destination address field including the core node address. An uplink static mapping entry with a longest address prefix matching the access node address in the first source address field is selected. The uplink static mapping entry is associated with the proxy node address. The access node address in the first source address field is replaced with the proxy node address associated with the uplink static mapping entry.

According to another aspect, a proxy node is provided. The proxy node has a proxy node address. The proxy node is configured to route packets between an access node and a core node. The access node has an access node address and the core node has a core node address. The proxy node includes a receiver and a processor in communication with the receiver. The receiver is configured to receive from the access node a first packet for transmission to the core node. The first packet includes a first source address field including the access node address and a first destination address field including the core node address. The processor is configured to select an uplink static mapping entry with a longest address prefix matching the access node address in the first source address field. The uplink static mapping entry is associated with the proxy node address. The processor replaces the access node address in the first source address field with the proxy node address associated with the uplink static mapping entry.

In accordance with yet another aspect, a network communication system for transporting packets is provided. The network system includes an access node, a core node and a proxy node. The access node has an access node address and includes an access node transmitter. The core node has a core node address and includes a core node receiver. The proxy node is in communication with the access node and the core node. The proxy node has a proxy node address and includes a proxy node receiver, a proxy node processor in communication with the proxy node receiver, and a proxy node transmitter in communication with the proxy node receiver and the proxy node processor. The access node transmitter is configured to transmit an uplink packet to the proxy node. The uplink packet includes a source address field including the access node address and a destination address field including the core node address. The proxy node receiver is configured to receive the uplink packet for transmission to the core node. The proxy node processor is configured to select an uplink static mapping entry with a longest address prefix matching the access node address in the source address field. The uplink static mapping entry is associated with the proxy node address. The proxy node processor is configured to replace the access node address in the first source address field with the proxy node address associated with the uplink static mapping entry. The proxy node transmitter is configured to transmit the uplink packet to the core node. The core node receiver is configured to receive the uplink packet from the proxy node.

In accordance with another aspect, the core node also includes a core node transmitter. The core node transmitter is configured to transmit a downlink packet of the plurality of packets to the proxy node. The downlink packet has a source address field including the core node address and a destination address field including the proxy node address, and a tunnel identification field including a tunnel identifier having a predefined static identifier tunnel prefix. The tunnel identifier identifying a downlink tunnel between the core node and the access node. The proxy node receiver is further configured to receive the downlink packet for transmission to the access node. If the proxy node receiver receives a message indicating that the access node has completed a handover process to a target access node having a target node address, then the proxy node processor is further configured to select a downlink dynamic mapping entry with a longest tunnel identifier prefix matching the tunnel identifier stored in the tunnel identification field, in which the downlink dynamic mapping entry is associated with the target node address and a target tunnel identifier corresponding to a downlink target tunnel between the proxy node and the target access node, replace the proxy node address in the destination address field with the target node address associated with the downlink dynamic mapping entry, and replace the tunnel identifier in the tunnel identification field with the target tunnel identifier associated with the downlink dynamic mapping entry. Otherwise, the proxy node processor is further configured to select a downlink static mapping entry with a longest tunnel identifier prefix matching the tunnel identifier in the tunnel identification field, in which the downlink static mapping entry is associated with the access node address, and replace the proxy node address in the destination address field with the access node address associated with the downlink static mapping entry.

DETAILED DESCRIPTION OF THE INVENTION

Figure 1:
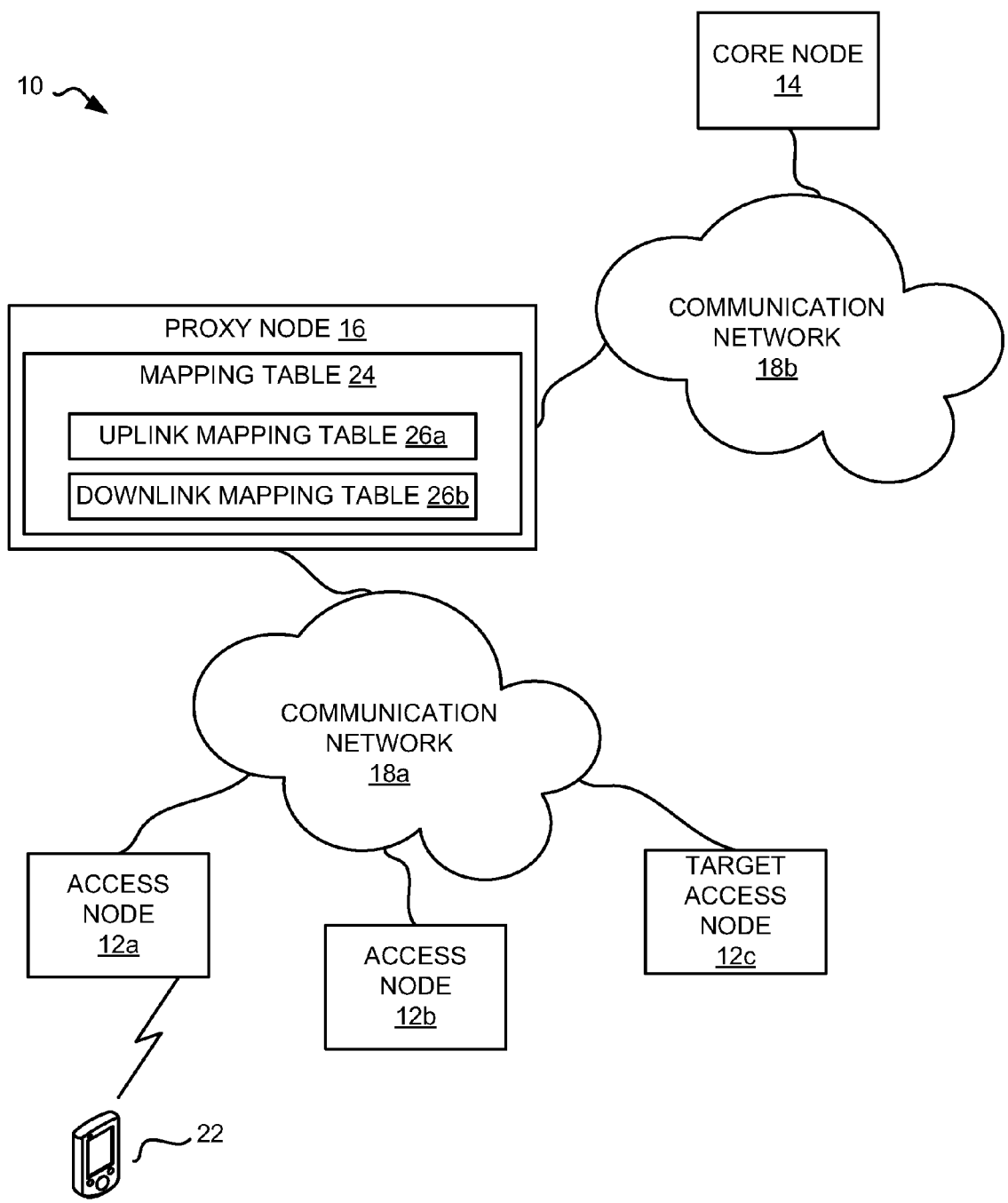
FIG. 1 is a diagram of an exemplary system for transporting packets in accordance with the principles of the present invention.

Embodiments of the present invention provide a method and system for minimizing the number of mapping, i.e., translation, entries in a GTP-U proxy node responsible for mapping GTP-U traffic between a larger set of GTP-U nodes and a smaller set of GTP-U nodes. Static identifier prefixes are allocated to the larger set of GTP-U nodes during network planning in order to improve translation performance. The allocation of static identifier prefixes simplifies management of the mapping table. The allocation of static identifier prefixes also allows the GTP-U proxy node to maintain a simple GTP data plane entity responsible for forwarding GTP data packets between the core network and the wireless communication area. A light GTP proxy control plane entity is responsible for creating dynamic mapping entries for handling subscriber mobility management between pairs of GTP-U nodes in a wireless communication area.

Before describing in detail exemplary embodiments that are in accordance with the present invention, it is noted that the embodiments reside primarily in combinations of apparatus components and processing steps related to implementing a method and system for minimizing the number of mapping, i.e., translation, entries in a GTP-U proxy node responsible for mapping GTP-U traffic between a larger set of GTP-U nodes and a smaller set of GTP-U nodes. Accordingly, the method, system and proxy node components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which reference designators refer to like elements, there is shown in FIG. 1 a diagram of an exemplary system constructed in accordance with the principles of the present invention and designated generally as "10." System 10 includes access node 12a, access node 12b, core node 14 and proxy node 16. Access nodes 12a and 12b are in communication with proxy node 16 via communication network 18a, and proxy node 16 is in communication with core node 14 via communication network 18b. Access nodes 12a and 12b communicate with core node 14 via proxy node 16. System 10 also includes target access node 12c. Target access node 12c is in communication with proxy node 16 via communication network 18a, and in communication with core node 14 via proxy node 16. Access nodes 12a, 12b and 12c (collectively referred herein as access nodes 12) may be GTP-U access nodes, core node 14 may be a GTP-U core node, and proxy node 16 may be a GTP-U proxy node.

In an exemplary embodiment, subscriber mobile device 22 is located in an area covered by access node 12a and is in communication with access node 12a. Subscriber mobile device 22 may be a mobile phone, a computer, and a wireless terminal, among others. When subscriber mobile device 22 moves from the area covered by access node 12a to an area covered by target access node 12c, access node 12a performs a handover operation with target access node 12c. When the handover operation is complete, subscriber mobile device 22 communicates with target access node 12c. Target access node 12c signals to proxy node 16 that a handover operation has been completed so that proxy node 16 can update mapping table 24. Mapping table 24 includes mapping entries, such as IP address and tunnel identifiers used by proxy node 16 to transport uplink and downlink packets between access nodes 12 and core node 14. Mapping table 24 may include uplink mapping table 26a including uplink mapping entries, and downlink mapping table 26b including downlink mapping entries.

Communication networks 18a and 18b may include a cellular communication network such as a GPRS network, and LTE network and the Public Switched Telephone Network (PSTN), or other wide area network (WAN), such as the Internet, as well as local area networks (LANs), such as an Ethernet LAN. Communication networks 18a and 18b may be a wireless network, such as Wi-Fi, satellite, infrared, Bluetooth, Near Field Communications, or other communication network, such as an optical communication network. Access nodes 12, core node 14 and proxy node 16 may also be connected via communications networks 18a and 18b to other nodes, e.g., computers (not shown).

Although FIG. 1 shows a single core node 14, proxy node 16, subscriber mobile device 22, and mapping table 24, the invention is not limited to such. Any number of access nodes 12, core nodes 14, proxy nodes 16, subscriber mobile devices 22 and mapping tables 24 may be used. For example, there may be "N" number of access nodes 12 and "M" number of core nodes 14 connected via one or more proxy nodes 16. Usually, there are more access nodes 12 than core nodes 14, i.e., the number "N" of access nodes 12 is generally greater than the number "M" of core nodes. Similarly, the number "N" is usually greater than or equal to the number "2," and the number "M" is usually greater than or equal to the number "1."

The larger set of "N" GTP-U access nodes 12 provides IP access to subscriber mobile devices 22 in a wireless communication area. Access node 12 can use a Wireless Application Protocol ("WAP") for the presentation and delivery of wireless information and telephony services on subscriber mobile device 22. Access node 12 may also be a component of a WAP node, a Flexible Application Protocol ("FAP") node or a component of a FAP node, an eNB or a component of an eNB, a Home Evolved Node B ("HeNB") or a component of an HeNB, a Radio Network Controller ("RNC") or a component of an RNC, a Service GPRS Support Node ("SGSN") or a component of a SGSN, among others. The smaller set of "M" GTP-U core nodes 14 is designed to provide subscriber IP service concentration as a component of the core network. Core node 14 can be a SGSN or a component of a SGSN, a Gateway GPRS Support Node ("GGSN") or a component of a GGSN, a Service Gateway ("SGW") or a component of a SGW, a Packet Data Network Gateway ("PGW") or a component of a PGW, among others.

Figure 2:
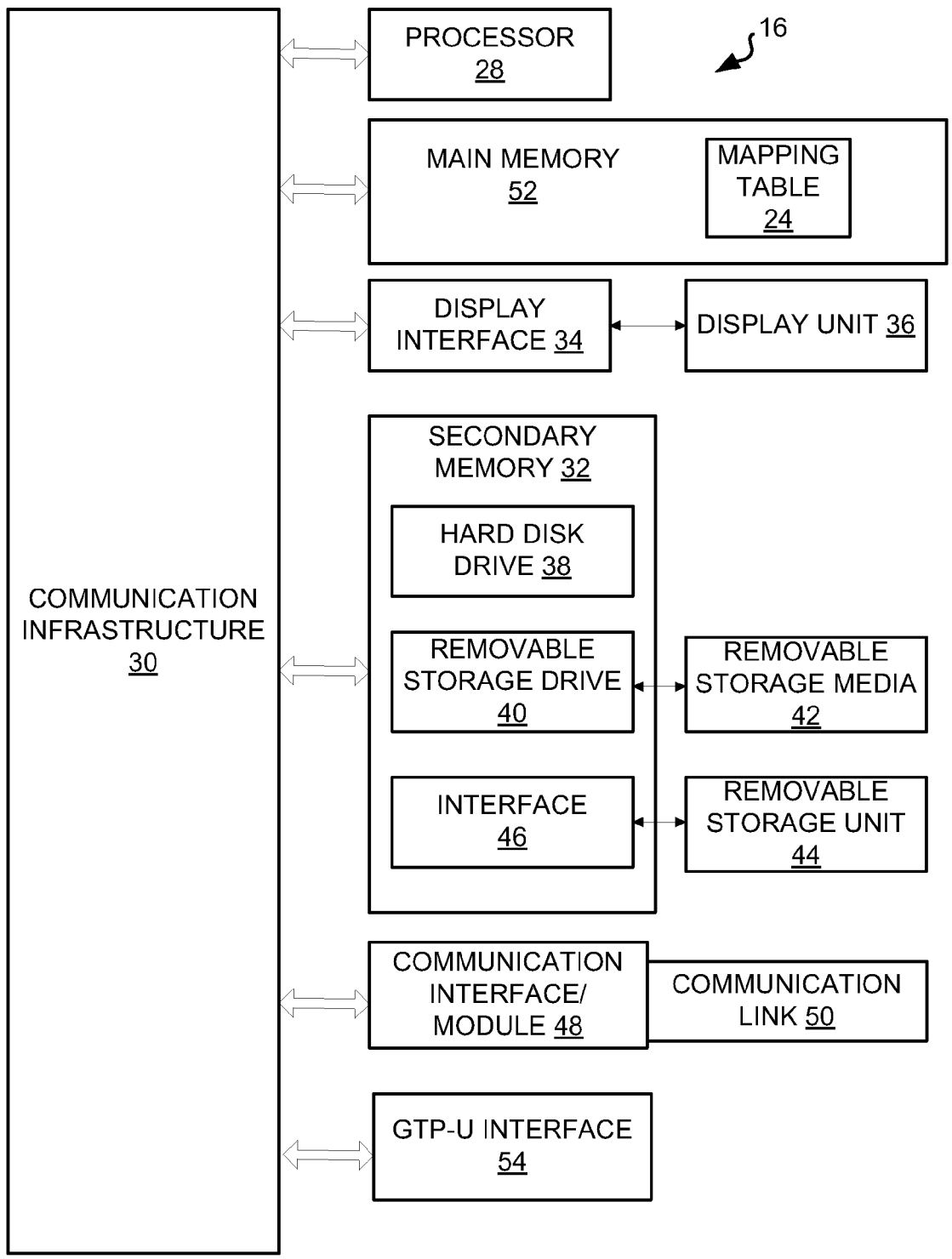
FIG. 2 is a block diagram of an exemplary proxy node constructed in accordance with the principles of the present invention.

FIG. 2 is a block diagram of an exemplary proxy node 16. Proxy node 16 may be a network controller used as a proxy that acts as an intermediary between access node 12 and core node 14. Proxy node 16 may be a GTP-U proxy node that performs lookup of mapping entries in mapping table 24 for each inbound and outbound packet. Proxy node 16 may act as an intermediary between a larger set of "N" number of GTP-U access nodes 12 and a smaller set of "M" number of GTP-U core nodes 14. Proxy node 16 is usually logically associated with the GTP-U access nodes 12, but may also be logically associated with one or more GTP-U core nodes 14.

Proxy node 16 includes one or more processors, such as processor 28, programmed to perform the functions described herein. Processor 28 is operatively coupled to a communication infrastructure 30, e.g., a communications bus, cross-bar interconnect, network, etc. Processor 28 may execute computer programs stored on disk storage for execution via secondary memory 32. Proxy node 16 may optionally include or share a display interface 34 that forwards graphics, text, and other data from the communication infrastructure 30

(or from a frame buffer not shown) for display on the display unit 36. Display unit 36 may be a cathode ray tube (CRT) display, a liquid crystal display (LCD), light-emitting diode (LED) display or touch screen display, among other types of displays.

Secondary memory 32 may include, for example, a hard disk drive 38 and/or a removable storage drive 40, representing a removable hard disk drive, magnetic tape drive, an optical disk drive, etc. The removable storage drive 40 reads from and/or writes to a removable storage media 42 in a manner well known to those having ordinary skill in the art. Removable storage media 42, represents, for example, a floppy disk, external hard disk, magnetic tape, optical disk, etc. which is read by and written to by removable storage drive 40. As will be appreciated, the removable storage media 42 includes a computer usable storage medium having stored therein computer software and/or data.

In alternative embodiments, secondary memory 32 may include other similar devices for allowing computer programs or other instructions to be loaded into the computer system and for storing data. Such devices may include, for example, a removable storage unit 44 and an interface 46. Examples of such may include a program cartridge and cartridge interface (such as that found in video game devices), flash memory, a removable memory chip (such as an EPROM, EEPROM or PROM) and associated socket, and other removable storage units 44 and interfaces 46 which allow software and data to be transferred from the removable storage unit 44 to other devices.

Proxy node 16 may also include a communications interface 48. Communications interface 48 allows software and data to be transferred to external devices. Examples of communications interface 48 may include a modem, a network interface (such as an Ethernet card), a communications port, a PCMCIA slot and card, wireless transceiver/antenna, etc. Software and data transferred via communications interface/module 48 may be, for example, electronic, electromagnetic, optical, or other signals capable of being received by communications interface 48. These signals are provided to communications interface 48 via the communications link (i.e., channel) 50. Channel 50 carries signals and may be implemented using wire or cable, fiber optics, a phone line, a cellular phone link, an RF link, and/or other communications channels. The computer system also includes a main memory 52, such as random access memory ("RAM") and read only memory ("ROM"). Main memory 52 may store mapping table 24.

It is understood that proxy node 16 may have more than one set of communication interface 48 and communication link 50. For example, proxy node 16 may have a communication interface 48/communication link 50 pair to establish a communication zone for wireless communication, a second communication interface 48/communication link 50 pair for low speed, e.g., WLAN, wireless communication, another communication interface 48/communication link 50 pair for communication with optical networks, and still another communication interface 48/communication link 50 pair for other communication.

Proxy node 16 may include one or more GTP-U interfaces 54. A GTP-U interface 54 uses a communication interface/communication link 50 to communicate with another GTP-U interface, such as a GTP-U interface associated with an access node 12 or core node 14 (similarly, each entity, such as access node 12 and core node 14 can be configured with one or more GTP-U interfaces). Computer programs, also called computer control logic, are stored in main memory 52 and/or secondary memory 32. For example, computer programs are stored on disk storage, i.e. secondary memory 32, for execution by processor 28 via RAM, i.e. main memory 52. Computer programs may also be received via communications interface 48. Such computer programs, when executed, enable the method and system to perform the features of the present invention as discussed herein. In particular, the computer programs, when executed, enable processor 28 to perform the features of the corresponding method and system. Accordingly, such computer programs represent controllers of the corresponding device.

Proxy node 16 functionality may be provided by a single node 16 or distributed among multiple nodes 16 or computing devices. As such, proxy node 16 functionality may be performed by several computing devices that may be located in the same general location or different locations, e.g., cloud computing. In other words, each computing device may perform one or more particular sub-processes of proxy node 16, and may communicate with each other via, for example, communication network 18a and 18b. As such, proxy node 16 may be a system of components, some of which may be virtual, that function collectively to forward packets.

Various software embodiments are described in terms of exemplary proxy node 16. It is understood that computer systems and/or computer architectures other than those specifically described herein can be used to implement the invention. It is also understood that the capacities and quantities of the components of the architecture described above may vary depending on the device, the quantity of devices to be supported, as well as the intended interaction with the device. For example, configuration and management of proxy node 16 may be designed to occur remotely by web browser. In such case, the inclusion of a display interface and display unit may not be required Mapping table 24 stored in memory 52 can be populated during the network planning stage. Specifically, mapping table 24 may be configured to include uplink mapping table 26a and downlink mapping table 26b. For example, during the network planning phase, the IP addresses, such as Internet Protocol version 4 ("IPv4") or Internet Protocol version 6 ("IPv6") addresses associated with the GTP-U interfaces of each entity, such as access node 12, proxy node 16 and/or core node 14, are pre-assigned using a single one or a small number of IP network prefixes. IP addresses that uniquely identify a number of GTP-U access node interfaces within a wireless communication area can be pre-assigned (using direct configuration of Dynamic Host Configuration Protocol), such as the interfaces of access nodes 12, proxy node 16, and core nodes 14. The pre-assigned IP addresses are used to configure mapping table 24.

For example, if proxy node 16 supports eight access nodes 12, each of the eight access nodes 12 may be assigned an IP address based on the IP address prefix 10.10.10.0/29, where the first 29 bits are the most significant bits. The prefix 10.10.10.0/29 includes the IP addresses 10.10.10.0, 10.10.10.1, 10.10.10.2, 10.10.10.3, 10.10.10.4, 10.10.10.5, 10.10.10.6 and 10.10.10.7. As such, a single IPv4 subnet 10.10.10.0/29 in mapping table 24 can be used to uniquely identify eight GTP-U interfaces within a wireless communication area.

Additionally, in another embodiment, the invention may be implemented in the core network instead of the access node network. As such, IP addresses may be assigned to each GTP-U interface(s) corresponding to core nodes 14, but not to GTP-U interfaces corresponding to access nodes 12. In yet another embodiment, the invention may be implemented in both the core network and the access nodes, i.e., IP addresses may be pre-assigned for access nodes 12, proxy nodes 16 and core nodes 14. Accordingly, the invention may be implemented on access nodes 12 or core nodes 14, or on both access nodes 12 and core nodes 14. Assigning an IP address to each GTP-U interface of an entity using a single one or a small number of IP network prefixes minimizes the number of static uplink and downlink mapping entries configured on GTP-U proxy node 16 for handling uplink and downlink GTP-U traffic. Of note, an entity, such as proxy node 16, may have two GTP-U interfaces 54, and each GTP-U interface 54 may be assigned its own unique IP address or they may share the same IP address but on separate virtual routing instances, each configured with its own mapping table.

Figure 3:
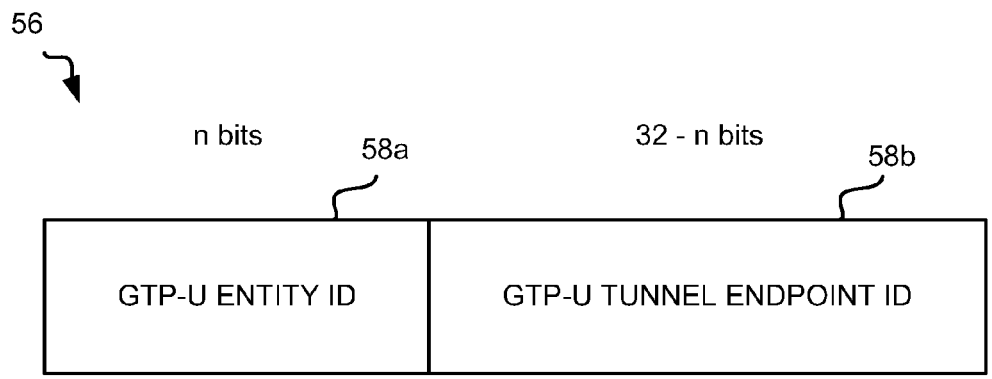
FIG. 3 is a block diagram of an exemplary unicast TEID structure constructed in accordance with the principles of the present invention.

FIG. 3 is a block diagram of an exemplary structure of tunnel identifier/TEID 56, i.e., a unicast TEID structure. A tunnel identifier/TEID 56 unambiguously identifies a tunnel between a core node 14 and access node 12. Tunnel identifier/TEID 56 includes GTP-U entity identification/TEID prefix 58a and GTP-U tunnel endpoint 58b. In addition to assigning IP addresses to each GTP-U interface 54 of each entity, a TEID prefix 58a, i.e., a tunnel prefix, can also be assigned to each entity. A pre-assigned TEID prefix 58a can uniquely identify a specific GTP-U access node 12 within a wireless communication area. The GTP-U tunnel endpoint 58b uniquely identifies a subscriber tunnel within a GTP-U access node 12.

For example, an entity, such as access node 12a, may be assigned a unique tunnel prefix 58a, such as TEID prefix "0x01" or a group of unique tunnel prefixes such as "0x01" and "0x04." The entity, which may be access node 12a, uses the unique TEID prefix 58a, to allocate unicast downlink tunnels for receiving downlink packets. The tunnel identifier/TEID 56, may have a value of "0x01FFFFFF" identifying a downlink tunnel. The "0x01" identifies the tunnel prefix 58a assigned to a specific entity, in this case access node 12a, and "FFFFFF" identifies the one tunnel allocated by access node 12a.

GTP-U tunnels are used to carry encapsulated T-PDUs and signaling messages between a given pair of GTP-U tunnel endpoints. The tunnel endpoint ID, i.e., TEID, which is present in the GTP header of a packet, indicates to which tunnel a particular G-PDU belongs to. In this manner, packets are multiplexed and de-multiplexed by GTP-U between a given pair of tunnel endpoints. The IP address to be used in the destination IP address field and the TEID value to be used in the TEID field are provided using a control plane protocol like GTPv1-C, GTPv2-C, RANAP, S1-AP, among others. Of note, an access node 12 acting as the receiving end side of a unicast GTP tunnel signals the proxy node IP address 54b to the core node 14. The proxy node IP address 54b is used as destination IP address for packets transmitted in the downlink direction.

In order to further minimize the number of mapping entries in the uplink and downlink direction in mapping table 24, the tunnel identifier/TEID 56, for unicast tunnels can be divided in two or more levels or hierarchical boundaries. The number of levels or the size of the boundaries can differ from wireless communication area to wireless communication area. For instance, the tunnel identifier/TEID 56 range may be divided in two parts: a most significant part ("MSP") and a least significant part ("LSP"). The MPS may be the tunnel prefix 58a, i.e., the TEID prefix, allocated to the entity. As such, the MPS can be used to uniquely identify a specific entity, such as access node 12a, within a wireless communication area. The LSP may be the GTP-U tunnel endpoint 58b uniquely identifying a subscriber tunnel within the entity, e.g., GTP-U access node 12a. Each tunnel prefix 58a or MSP for an entity can be represented by a single downlink static mapping entry in mapping table 24 of GTP-U proxy node 16.

This two-level structure for tunnel identifier/TEID 56 may reduce the number of downlink static mapping entries configured on the GTP-U proxy 16 for handling downlink GTP-U traffic as compared with a single level structure. Each GTP-U access node 12 can implement its own LSP, i.e., GTP-U tunnel endpoint 58b allocation method. For instance, each GTP-U access node 12 can dynamically allocate a random LSP number to each of its GTP-U unicast downlink tunnels. Of note, the uplink tunnels are allocated by core node 14, and not by access node 12. As such, an IP address and a tunnel prefix may also be assigned to core node 14, so that core node 14 may allocate uplink tunnel identifiers including the assigned tunnel prefix.

While the 3GPP standards do not define an internal structure for the tunnel identifier/TEID 56 value, the 3GPP standards indicate that the tunnel identifier/TEID is a 32 bit unsigned integer ranging from zero to 4,294,967,295 (zero is reserved for GTP-U signaling messages). Since exemplary tunnel identifier/TEID 56 has a two level TEID structure, if the GTP-U entity identification/tunnel prefix 58a is eight bits long, i.e., n=8 bits, then the structure of tunnel identifier/TEID 56 allows up to 255 GTP-U access nodes 12 within a wireless communication area (the binary number "1111 1111" is equivalent to the decimal number 255). Each of the 255 GTP-U access nodes 12 can support up to 1,677,215 unicast downlink GTP-U tunnels (32 bits minus 8 bits is 24 bits, which encompasses the values of 0 to 1,677,215).

Figure 4:
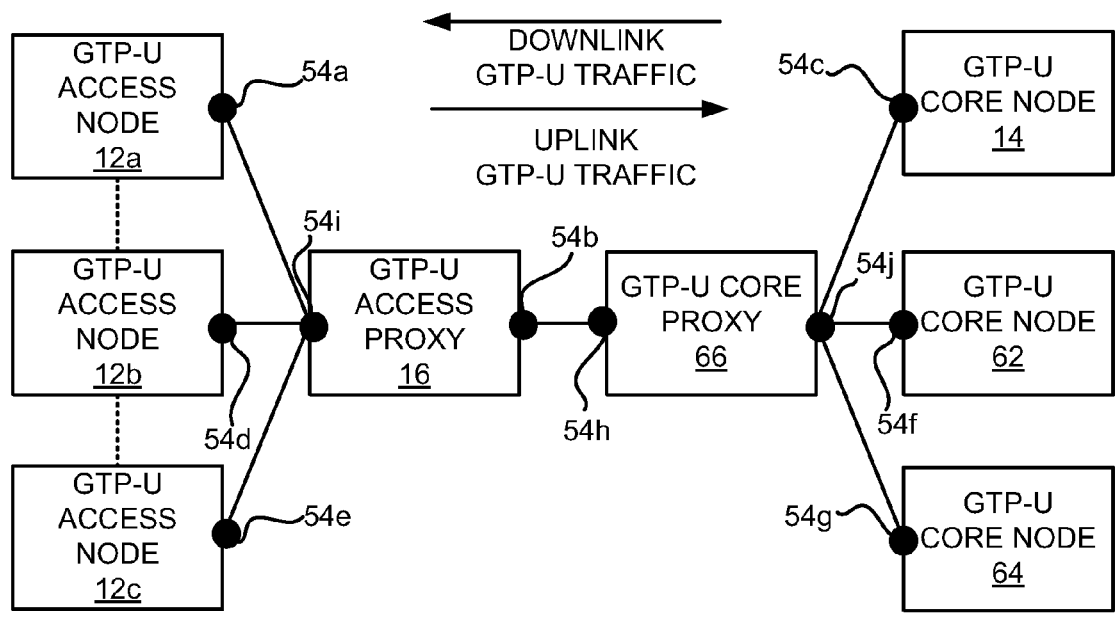
FIG. 4 is a block diagram of another exemplary system for transporting packets, wherein the system includes an access proxy node with multiple access nodes and a core proxy node and multiple core nodes constructed in accordance with the principles of the present invention.

An exemplary proxy node 16 in communication with core proxy node 66 is described with reference to FIG. 4. Proxy node 16 is logically associated and in communication with a set of access nodes that includes access node 12a, access node 12b and target access node 12c. Proxy node 16 is also in communication with a set of core nodes that includes core node 14, core node 62 and core node 64 via core proxy node 66. Access nodes 12a, 12b, 12c, core nodes 14, 62, 64, core proxy node 66 and proxy node 16 may be GTP-U nodes having GTP-U interfaces for communication with each other. For example, access node 12a includes interface 54a, proxy node 16 includes interfaces 54b and 54i, core node 14 includes interface 54c, access node 12b includes interface 54d, target access node 12c includes interface 54e, core node 62 includes interface 54f, core node 64 includes interface 54g, and core proxy node 66 includes interfaces 54h and 54j for communicating with other nodes.

In an exemplary embodiment, core node 14 transmits a downlink packet, e.g., downlink GTP-U traffic, to access node 12a. In order for the packet to reach access node 12a, core node 14 transmits the downlink packet to core proxy node 66 using its GTP-U interface 54c. The packet includes a header, such as an IP header, that includes a source address field and a destination address field. The source address field includes the IP address of core node 14, i.e., the IP address of the GTP-U interface 54c associated with core node 14. The destination address field includes the IP address of proxy node 16, i.e., the IP address of GTP-U interface 54b associated with proxy node 16. The packet also includes a GTP-header that includes the downlink TEID associated with the packet. The packet is received by core proxy node 66 via its GTP-U interface 54j. Core proxy node 66 forwards the packet to proxy node 16 via its GTP-U interface 54h. Proxy node 16 receives the packet via its GTP-U interface 54b, and forwards the updated packet to access node 12a using its GTP-U interface 54i. Access node 12a receives the downlink packet via its GTP-U interface 54a.

In another exemplary embodiment, an uplink packet, e.g., uplink GTP-U traffic, can be transmitted from access node 12a to core node 14. In order for the uplink packet to reach core node 14, access node 12a sends the uplink packet to proxy node 16 using its GTP-U interface 54a. The packet includes a header, such as an IP header, that includes a source address field and a destination address field. The source address field includes the IP address of the access node and the destination address field includes the IP address of core proxy node 66. Proxy node 16 receives the uplink packet via its GTP-U interface 54i and forwards the updated packet to GTP-U core proxy node 66 using its GTP-U interface 54b. GTP-U proxy core node 66 receives the uplink packet via its GTP-U interface 54h and forwards the updated packet to core node 14 via its GTP-U interface 54j. Core node 14 receives the uplink packet via its GTP-U interface 54c. Of note, even though FIG. 4 shows that the nodes, i.e., access nodes 12a, 12b, 12c, core nodes 14, 62, 64, proxy node 16 and core proxy node 66, are configured with a single GTP-U interface, e.g., a single GTP-U endpoint, the nodes can be configured with multiple GTP-U interfaces.

Figure 5:
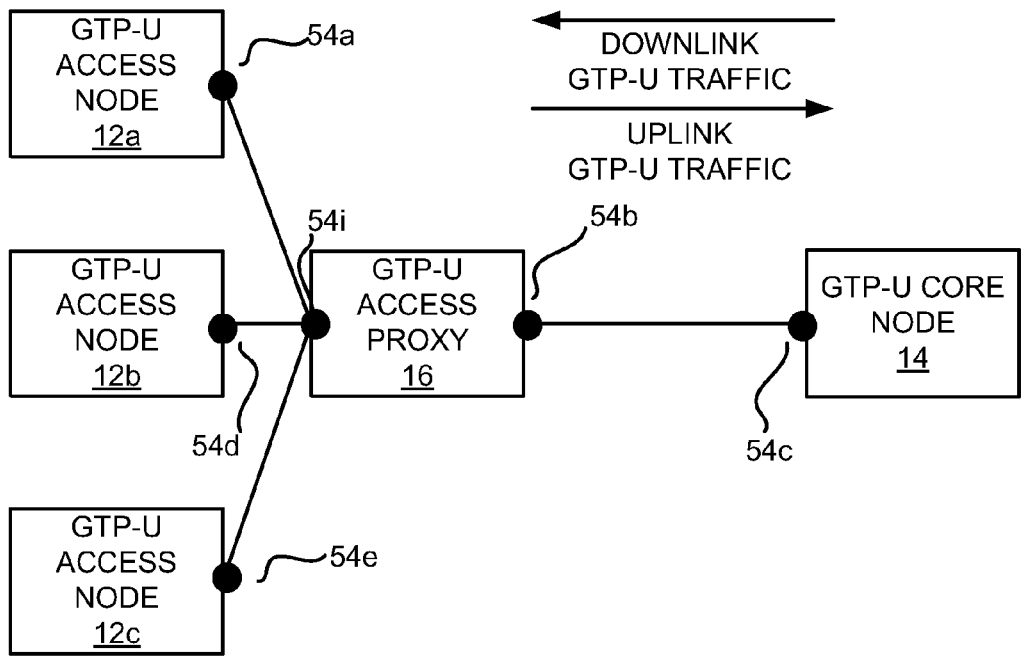
FIG. 5 is a block diagram of another exemplary system for transporting packets, wherein the system includes a single access proxy node with multiple access nodes and a single core node in accordance with the principles of the present invention.

FIG. 5 is a block diagram of an exemplary GTP-U proxy node 16 logically associated with a set of GTP-U access nodes 12 and one GPT-U core node 14, i.e., N=3 and M=1. Even though FIG. 5 shows only one core node 14 and one proxy node 16, the invention is not limited to such. Any number of core nodes 14 and proxy nodes 16 may be used. For example, the invention may be implemented with three access nodes 12 and two core nodes 14, i.e., N=3 and M=2. Further the invention may be implemented using multiple proxy nodes 16. Wireless areas, i.e., cells, managed by different access nodes, such as access node 12a, access node 12b and access node 12c, may be configured not to overlap with each other, i.e., the IP addresses and TEID prefixes allocated to each GTP-U interface may not overlap. Access nodes 12 may have full dependency between each other Specifically, the TEID prefix allocated to each access node 12 may be unique within a wireless communication area implying a dependency between access nodes 12 in a given geographical location that is handled through network planning or other means including automatic discovery and/or negotiation.

Figure 6:
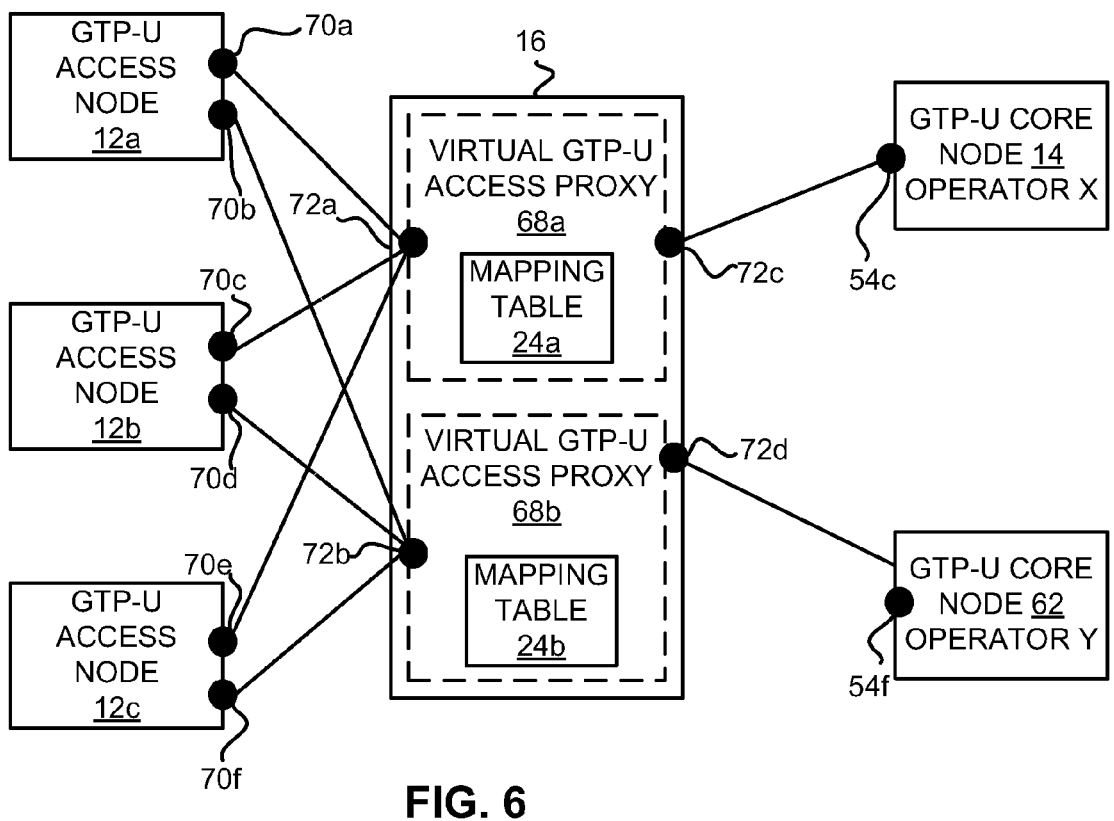
FIG. 6 is a block diagram of another exemplary system for transporting packets using two virtual proxies configured within an access proxy node in accordance with the principles of the present invention.

FIG. 6 is a block diagram of proxy node 16 comprising two exemplary virtual proxy nodes 68a and 68b. Virtual proxy nodes 68a and 68b may be virtual GTP-U access proxy nodes implemented using software installed in a single physical proxy node 16. Virtual proxy nodes 68a and 68b connect to access nodes 12 and to core nodes 14 and 62. Each virtual proxy node 68a and 68b has two GTP-U interfaces. Virtual proxy node 68a includes GTP-U interfaces 72a and 72c, and virtual proxy node 68b includes GTP-U interfaces 72b and 72d.

In this exemplary embodiment, each entity in the larger set of GTP-U paths, e.g., each GTP-U access node 12, is configured with two GTP-U interfaces. Access node 12a includes GTP-U interfaces 70a and 70b, access node 12b includes GTP-U interfaces 70c and 70d, and target access node 12c includes GTP-U interfaces 70e and 70f. Each access node 12 communicates with core nodes 14 and 62 via a different virtual proxy node. For example, access nodes 12 communicate with core node 14 via virtual proxy node 68a using their respective GTP-U interfaces 70a, 70c and 70e. Access nodes 12 communicate with core node 62 via virtual proxy node 68b using their respective GTP-U interfaces 70b, 70d and 70f.

Core nodes, e.g., core node 14 and 62, may be managed by a different operator. For example, core node 14 may be managed by Operator X, who may be AT&T®, and core node 62 may be managed by Operator Y, who may be Verizon®. Virtual proxy node 68a is logically separated from virtual proxy node 68b, even though virtual proxy nodes 68a and 68b share resources of a physical node or component, i.e., proxy node 16. Each virtual proxy node 68a and 68b performs the relay or mapping (translation) functions between the larger set of GTP-U paths (the paths between access nodes 12 and virtual proxy nodes 68a and 68b) and the smaller set of GTP-U paths (the paths between virtual proxy nodes 68a, 68b and core nodes 14 and 62) for uplink and downlink G-PDUs. The smaller set of GTP-U paths is also referred to as the aggregated set of data paths. Virtual proxy node 68a includes mapping table 24a and virtual proxy node 68b includes mapping table 24b. Each mapping table 24a and 24b includes uplink and downlink mapping entries.

Figure 7:
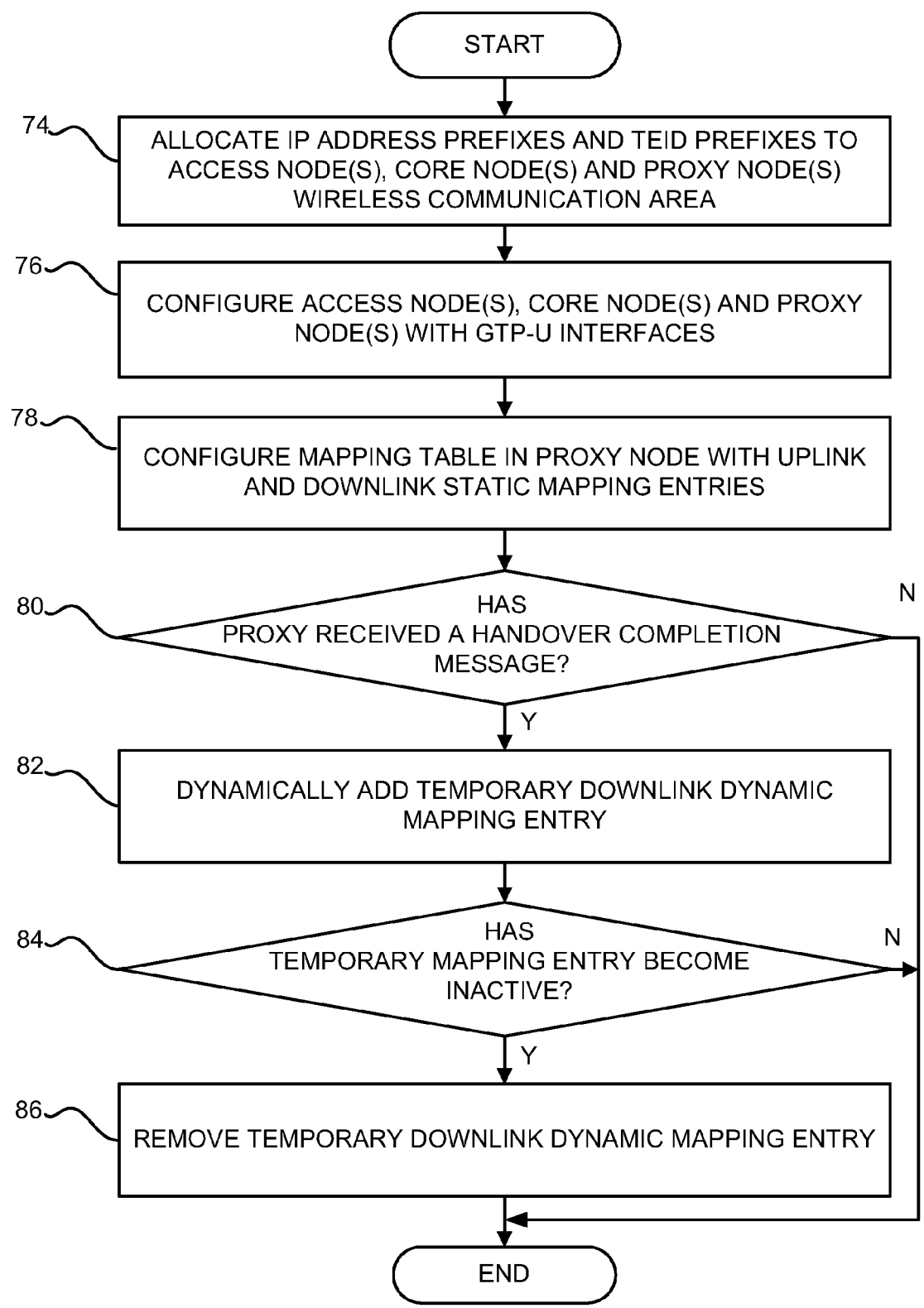
FIG. 7 is a flow chart of an exemplary process performed by a Control Plane function in accordance with the principles of the present invention.
Figure 10:
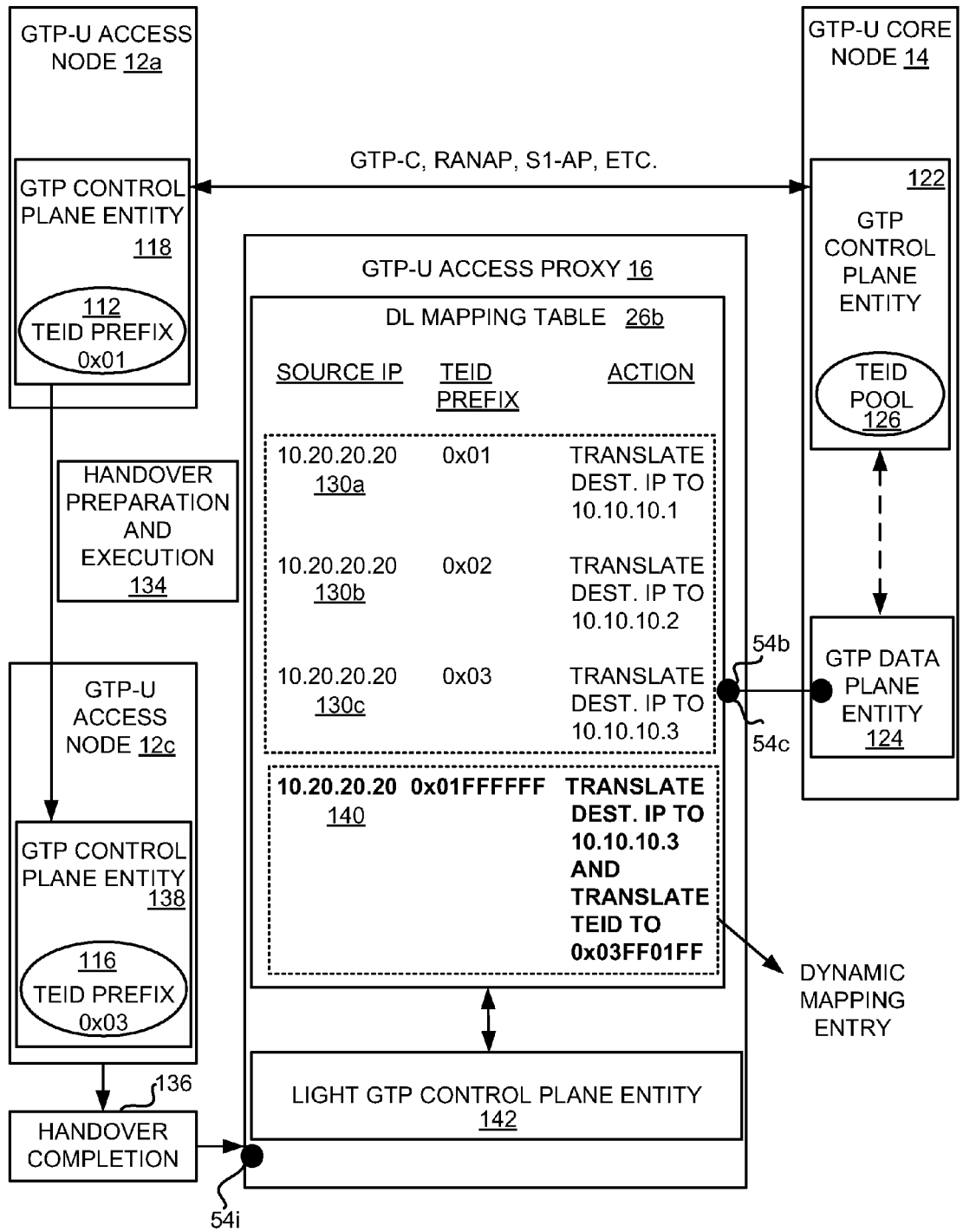
FIG. 10 a block diagram of the exemplary system of FIG. 5 updating a downlink mapping table after a mobility event constructed in accordance with the principles of the present invention.

FIG. 7 is a flow chart of an exemplary process performed by a GTP-U Control Plane Entities, such as a GTP-U Control Plane Entity 118, 138, and 142 (shown in FIG. 10). During tunnel establishment, the GTP-U Control Plane Entity of an access node 12 signals the proxy node IP address 54b to the Control Plane Entity 122 of the core node 14 needed for the transmission of downlink packets. Proxy node 16 acts as a specialized gateway acting as an aggregated GTP-U endpoint for several GTP-U access nodes 12 seeking GTP-U resource allocation to one or more remote GTP-U core nodes 14. Proxy node 16 may use uplink and downlink static mapping entries to forward GTP-U traffic between the wireless communication area including access nodes 12 and the core network including core node 14, and vice versa. The static mapping entries may be based on identifier prefixes defined during the network planning phase.

In addition to using downlink and uplink static mapping entries, proxy node 16 can also use dynamic downlink mapping entries to temporarily forward downlink GTP-U traffic to a new GTP-U target access node 12c after a handover is completed from access node 12a to target access node 12c. Knowledge of the proxy node IP address of proxy node 16 may be required by access node 12a and target access node 12c prior to GTP-U data transfer. The proxy node IP address of proxy node 16 is signaled to the peer GTP-U core node 14 using a control plane protocol, such as GTPv1-C, GTPv2-C, RANAP, or S1-AP, among others.

During the network planning stage, the IP address prefixes and the tunnel identifier/TEID prefixes are allocated to access nodes 12. In an exemplary embodiment, the IP address 10.10.10.1 is assigned to access node 12a, 10.10.10.2 is assigned to access node 12b and 10.10.10.3 is assigned to target access node 12c. Similarly, TEID prefix "0x01" is assigned to access node 12a, "0x02" is assigned to access node 12b and "0x03" is assigned to target access node 12c. Access nodes 12 use their corresponding assigned TEID prefix to identify downlink tunnels. Additionally, the IP address 10.20.20.20 is assigned to proxy node 16 and 10.20.20.30 is assigned to core node 14. A TEID prefix may also be assigned to core node 14 to identify uplink tunnels between core node 14 and access nodes 12 (Block 74).

Access nodes 12, proxy node 16 and core node 14 are configured with one or more GTP-U interfaces (Block 76). Mapping table 24 in proxy node 16 is configured to include uplink and downlink static mapping entries based on the assigned IP address prefixes and the assigned TEID prefixes (Block 78). For example, mapping table 24 may be configured to include uplink mapping table 26a including uplink static mapping entries, and downlink mapping table 26b including downlink static mapping entries. Future downlink dynamic mapping entries are later added by proxy node 16 as needed after a handover process is completed.

If proxy node 16 receives a handover completion message, proxy nodes 16 adds a downlink dynamic mapping entry to mapping table 24 (Block 80 and 82). Proxy node 16 determines whether the dynamic mapping entry has become inactive, i.e., it is not being used (Block 84). If so, proxy node 16 removes the temporary downlink dynamic mapping entry (Block 86). Else, the downlink dynamic mapping entry remains in mapping table 24. Of note, if proxy node 16 did not receive a handover completion message, proxy node 16 does not need to add a downlink dynamic mapping entry.

Uplink G-PDU Packet Handling with Static Mapping

Figure 8:
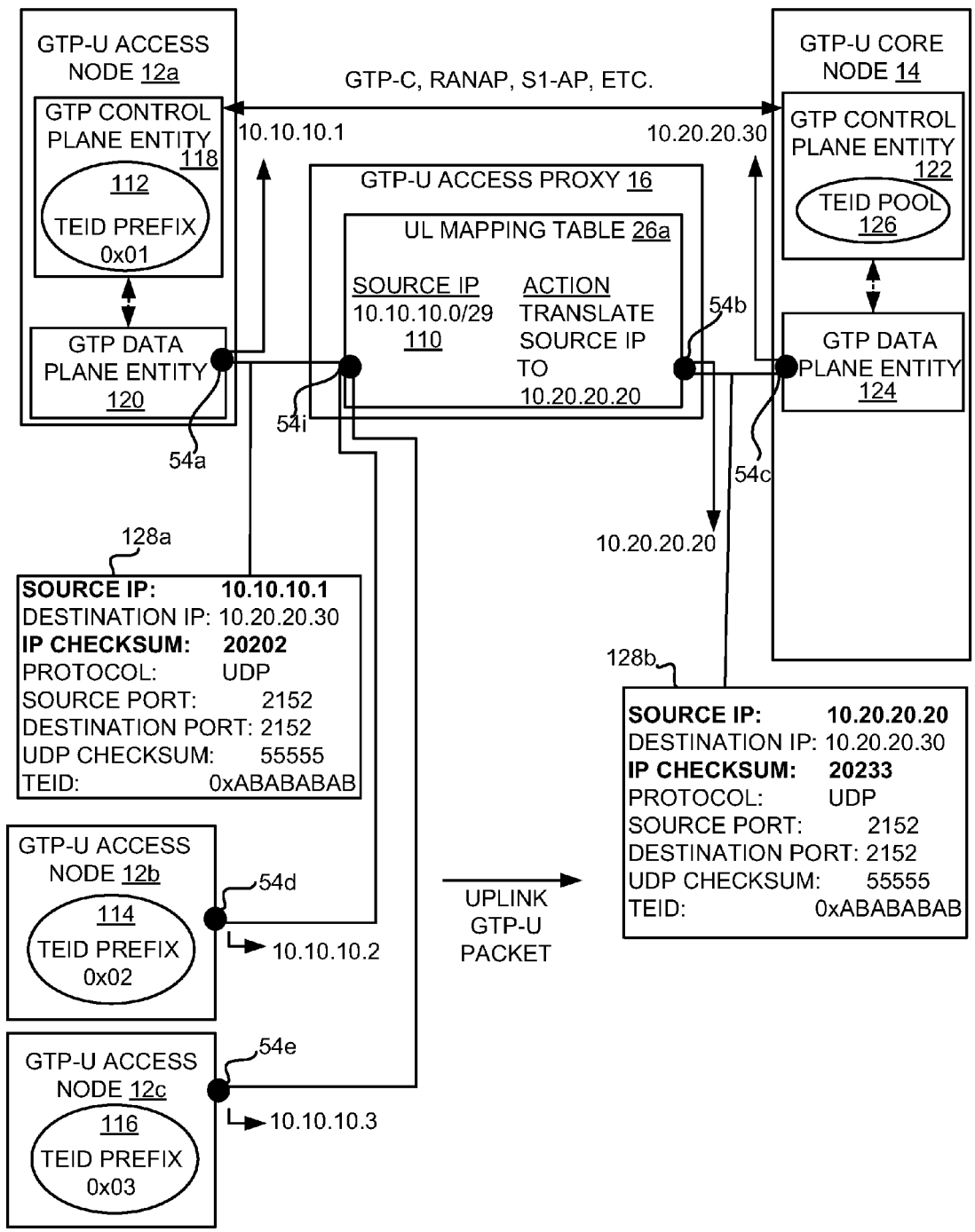
FIG. 8 is a block diagram of the exemplary system of FIG. 5 transporting an uplink packet, constructed in accordance with the principles of the present invention.

FIG. 8 is a block diagram of an exemplary proxy node 16 handling uplink unicast G-PDU packets originating from access nodes 12. In an exemplary embodiment, proxy node 16 supports three access nodes 12. During network planning, proxy node 16 has been pre-assigned an IP address of 10.20.20.20 and core node 14 has been pre-assigned an IP address of 10.20.20.30. Similarly, access node 12*a* has been pre-assigned an IP address of 10.10.10.1, access node 12*b* has been pre-assigned an IP address of 10.10.10.2, and target access node 12*c* has been pre-assigned an IP address of 10.10.10.3. As such, interface 54*a* is associated with IP address 10.10.10.1, interface 54*d* is associated with IP address 10.10.10.2 and interface 54*c* is associated with IP address 10.10.10.3.

Access node 12*a* has also been pre-assigned/pre-allocated a tunnel prefix, e.g., TEID prefix 112, of "0x01," access node 12*b* has been pre-assigned a TEID prefix 114 of "0x02" and target access node 12*c* has been pre-assigned a TEID prefix 116 of "0x03." As such, when access node 12*a* allocates a downlink tunnel between core node 14 and access node 12*a*, the downlink tunnel will have a tunnel identification 56, e.g. TEID, that includes the TEID prefix "0x01." Likewise, a downlink tunnel between core node 14 and access node 12*b* will have a TEID that includes TEID prefix "0x02," and a downlink tunnel between core node 14 and target access node 12*c* will have a TEID that includes TEID prefix of "0x03."

Each access node 12 and core node 14 includes a GTP Control Plane Entity and a GTP Data Plane Entity. For example, access node 12*a* includes GTP Control Plane Entity 118 and GTP Data Plane Entity 120 in communication with each other. Similarly, core node 14 includes GTP Control Plane Entity 122 and GTP Data Plane Entity 124 in communication with each other. Further, GTP Control Plane Entity 122 in core node 14 includes TEID pool 126. GTP Control Plane Entity 118 communicates with GTP Control Plane entity 122 using a control plane protocol like GTP-C, RANAP, S1-AP, among others. During tunnel establishment, GTP-U Control Plane Entity 118 of access node 12*a* communicates the proxy node IP address 54*b* to Control Plane Entity 122 of core node 14 needed for the transmission of downlink packets. GTP-U Control Plane Entity 122 of core node 14 communicates the core node IP address 54*c* to Control Plane Entity 118 of access node 12*a* needed for the transmission of uplink packets. Of note, the GTP Control Plane Entity for a node does not need to be co-located with the GTP Data Plane Entity. The GTP Control Plane Entity and the GTP Data Plane Entity can exist on two separate nodes. GTP Control Plane Entity 118 of access node 12*a* may also communicate with another core node dedicated to the handling of signaling messages like the Mobility Management Entity (not shown) in a LTE network which in turns communicates with GTP Control Plane Entity 122 of GTP-U core node 14. Although only the GTP Control Plane Entity and GTP Data Plane Entity of access node 12*a* and core 14 are shown, access nodes 12*b* and 12*c* also include a GTP Control Plane Entity and a GTP Data Plane Entity.

Proxy node 16 receives an uplink packet 128*a* from access node 12*a*. Packet 128*a* includes an IP header including a source IP address field, a destination IP address field, an IP checksum field, and IP payload field. The source IP address field includes IP address 10.10.10.1 corresponding to access node 12*a*, and the destination IP address field includes IP address 10.20.20.30 corresponding to core node 14. The IP checksum field includes an exemplary value of "20202" representing the checksum of the IP header. At the source side, i.e., access node 12*a*, the IP checksum is calculated and set in the IP header. At the destination side, i.e., core node 14, the IP checksum is again calculated and crosschecked with the existing IP checksum value in the IP header to ascertain whether the data packet is OK or whether it is corrupted.

The IP payload field of packet 128*a* includes a UDP header and UDP payload. The UDP header includes a protocol field, a source port field, a destination port field and a UDP checksum field. In exemplary packet 128*a*, the protocol field indicates that the protocol is UDP, the source port field and destination port field include the exemplary value of "2152" representing a port identifier, and the UDP checksum includes the exemplary value of "55555." The UDP payload of packet 128*a* includes a GTP-U header and a GTP-U payload. The GTP-U header includes a TEID field with the exemplary value of "0xABABABAB," which unambiguously identifies an uplink tunnel between access node 12*a* and core node 14. The uplink tunnel is allocated by core node 14 is identified using a TEID from TEID Pool 126.

Proxy node 16 evaluates uplink mapping table 26*a* for an uplink static mapping entry with a longest address prefix matching the access node address in the source IP address field of packet 128*a*. Proxy node 16 uses an uplink and not a downlink static mapping entry given that the packet is going in the uplink direction. Proxy node 16 determines which IP address to use to replace the source node address with. Uplink static mapping entry 110 includes the IP address prefix 10.10.10.0/29. The "/29" indicates that 29 of the most significant bits of 10.10.10.0 should match the 29 most significant bits of the source IP address field.

For example, since uplink static mapping entry 110 indicates that the first 29 bits are relevant, the IP address prefix 10.10.10.0/29 will match access node addresses where the first three bytes of the IP addresses, i.e., the first 24 bits, represent 10.10.10 (decimal 10 is equivalent to binary 0000 1010), and the last 8 bits represent decimal 0, 1, 2, 3, 4, 5, 6 or 7 (i.e., the last eight bits are 00000 000, 00000 001, 00000 010, 00000 011, 00000 100, 00000 101 or 00000 111). In this example, the last three bits (32 bits minus 29 bits) of the access node address are not relevant in the comparison with IP address prefix 10.10.10.0/29.

In this example, the last three bits of the access node address can have any value and IP address prefix 10.10.10.0/29 will still match a four byte access node address where each of the first three bytes have the value of 0000 1010 (decimal 10), and the last byte has the binary value of 00000 for bits eight through four. Hence, uplink static mapping entry 110 will match the following access node addresses: 10.10.10.0, 10.10.10.1, 10.10.10.2, 10.10.10.3, 10.10.10.4, 10.10.10.5, 10.10.10.6 and 10.10.10.7. One uplink mapping entry is enough to represent all access nodes 12 supported by proxy node 16. In fact, uplink static mapping entry 110 can represent up to eight access nodes. Uplink static mapping entry 110 can be configured to match any number of bits of the GTP-U access node IP prefix. For example, the uplink static mapping entry may have the value of 10.10.10.0/28, 10.10.10.0/30, etc.

Proxy node 16 determines that uplink static mapping entry 110 is the mapping entry that most closely matches the access node address. While other mapping entries may match part of the access node address, uplink static mapping entry 110 is the best match, i.e., other mapping entries may match part of the access node address, but uplink static mapping entry 110 is the mapping entry that matches more of the most significant bits of the access node address than any other mapping entry. This is because uplink static mapping entry 110 has previously been pre-configured during a network planning stage to most closely match the 29 most significant bits of the access node address.

Multiple mapping entries can be configured on proxy node 16, but only one entry is selected by proxy node 16 for each G-PDU packet. Other mapping entries may match at least part of the access node address. For example, if uplink mapping table 26a included another uplink static mapping entry 10.10.10.0/28, this later uplink static mapping entry would match the first 28 bits of the access node address. However, since uplink static mapping entry 110 matches the first 29 bits of the access node address, then uplink static mapping entry is the uplink static mapping entry that has the longest address prefix matching the access node address. Additionally, if uplink mapping table 26a had yet another uplink static mapping entry 10.10.10.1/32, this later uplink static mapping entry would be the mapping entry having the longest address prefix matching the access node address and would be selected. Accordingly, in the uplink direction, proxy node 16 selects a specific entry based on the longest IP address prefix match.

Uplink static mapping entry 110 is a "static" mapping entry because it was pre-configured on uplink mapping table 26a. Uplink static mapping entry 110 does not expire, i.e., it does not time out, but remains configured in uplink mapping table 26a until the user or the system disables or deletes uplink static mapping entry 110. Static uplink mapping entries can be configured by the user or configured via a separate configuration or discovery protocol.

Proxy node 16 selects uplink static mapping entry 110 as having the longest IP address prefix matching the access node address. Proxy node 16 determines that uplink static mapping entry 110 is associated with proxy node address 10.20.20.20. Uplink static mapping entry 110 may specify that the access node address in the source IP addresses field is to be replaced with proxy node address 10.20.20.20. For example, uplink static mapping entry 110 may include the following instruction: When the longest IP address prefix matching is "10.10.10.0/29," "translate source IP to 10.20.20.20." Proxy node 16 replaces the access node address in the source IP address field with the proxy node address. Uplink static mapping entry 110 may specify any number of actions for proxy node 16 to perform when uplink static mapping entry 110 matches the access node address.

As such, during uplink G-PDU packet handling, proxy node 16 replaces the source node address 10.10.10.1, i.e., the access node address of access node 12a, in the source IP address field of packet 128a with its own proxy node address 10.20.20.20 before forwarding the unicast uplink packet to core node 14. The source node address translation is implemented using an uplink static mapping entry 110 based on the source node address located in the source IP address field of the IP header of the original G-PDU packet. Since the source IP address field in the IP header has been modified to include the proxy node address, proxy node 16 recomputes the checksum of the IP header so that the packet is not rejected by its destination, i.e., core node 14. Packet 128b shows the forwarded version of packet 128a as modified by proxy node 16. Specifically, two fields of the original packet 128a are changed: the source IP address field now includes proxy node address 10.20.20.20 and the IP checksum includes the value of "20233." Packet 128b is forwarded to core node 14.

Accordingly, the steps to forward a unicast G-PDU packet originating from access node 12 to core node 14 include: (1) selecting an uplink static mapping entry by performing the longest IP address prefix match on the source IP address; (2) replacing the source IP address with the proxy node address provided by the uplink static mapping entry selected; (3) recomputing the IP header checksum based at least on the translated source IP address; and (4) forwarding the GTP-U packet to core node 14, which can be a locally-connected node or a node connected over multiple IP hops.

Downlink G-PDU Packet Handling with Static Mapping

Figure 9:
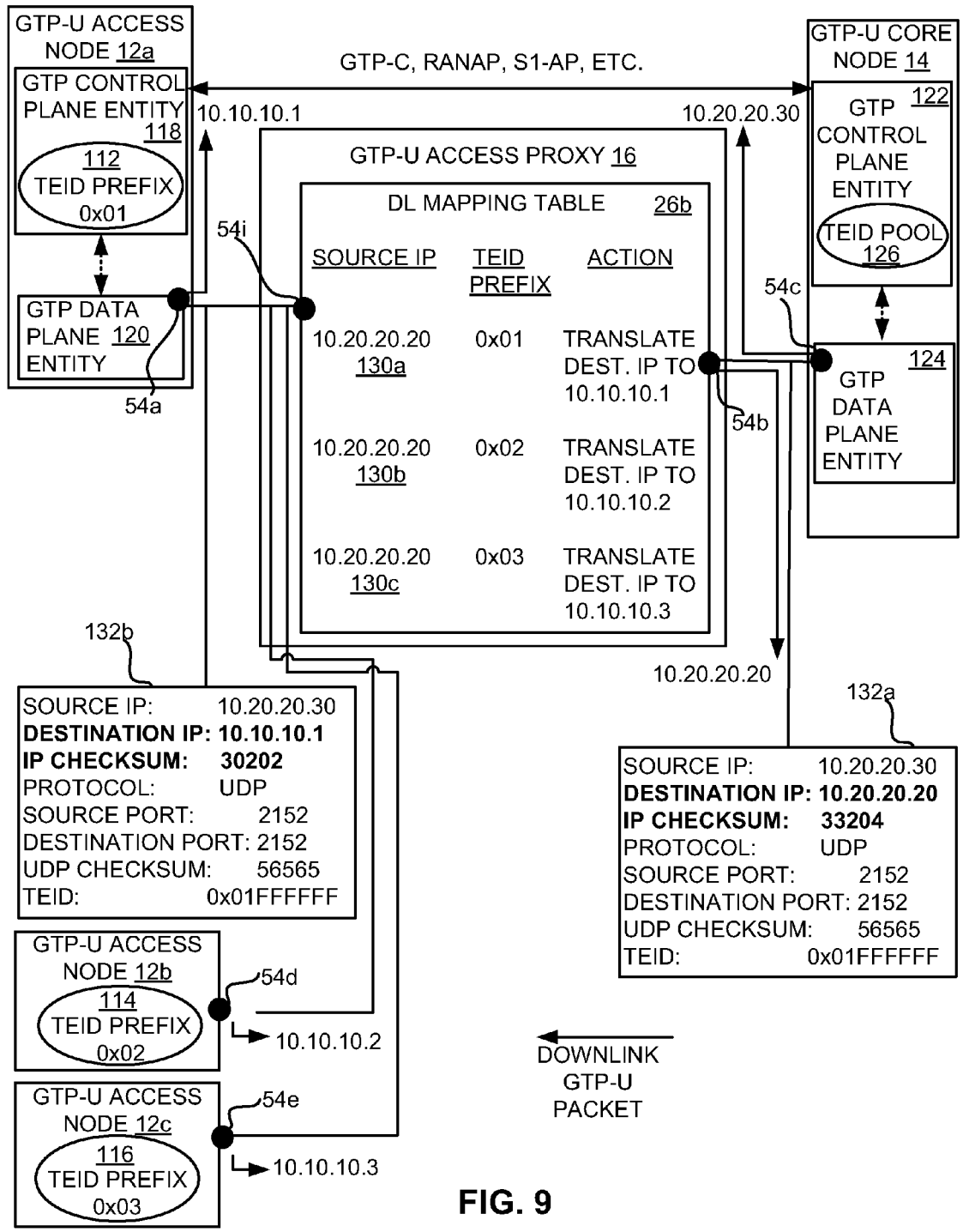
FIG. 9 is a block diagram of the exemplary system of FIG. 5 transporting a downlink packet constructed in accordance with the principles of the present invention.

FIG. 9 is a block diagram of exemplary proxy node 16 handling downlink unicast G-PDU packet 132a originating from core node 14. Downlink G-PDU packet handling with static mapping may include replacing the destination IP address before forwarding a unicast G-PDU packet to access node 12a. The destination address translation may be implemented using a downlink static mapping entry based at least in part on the destination IP address (located in the IP header) and the tunnel identifier/TEID 56 (located in the GTP-U header) of the original G-PDU packet 132a. The downlink packet includes the proxy node IP address of proxy node 16 in the destination IP address. During network planning, downlink static mapping entry 130a can be configured to match the proxy node IP address of proxy node 16 and the tunnel identifier/TEID 56, or alternatively, just the tunnel prefix 58a when there is no mobility event, in packet 132a. The action associated with the downlink static mapping entry 130a may include replacing the destination IP address, e.g., the proxy node IP address, with the access node IP address associated with the tunnel identifier/TEID 56. A downlink static mapping entry does not expire, i.e., it does not time out, but remains configured until the user or the system disables or deletes the downlink static mapping entry. As with the uplink static mapping entry, a downlink static mapping entry can be configured by the user or can be configured via a separate configuration or discovery protocol. While multiple downlink static mapping entries can be configured on proxy node 16, only one entry is selected for each G-PDU packet. In the downlink direction, proxy node 16 selects a specific downlink mapping entry based at least in part on the longest TEID prefix match identifying the most significant part of the TEID.

In an exemplary embodiment, proxy node 16 receives downlink packet 132a from core node 14. The source IP address field of packet 132a includes IP address 10.20.20.30 corresponding to core node 14, and the destination IP address field includes IP address 10.20.20.20 corresponding to proxy node 16. The IP checksum field includes an exemplary value of "33204" representing the checksum of the IP header. The protocol field indicates that the protocol is UDP, the source port field and destination port field include the exemplary value of "2152," and the UDP checksum includes the exemplary value of "56565." The GTP-U header includes a TEID field with the exemplary tunnel identifier/TEID 56 value of "0x01FFFFFF," which uniquely identifies a downlink tunnel between core node 14 and access node 12a. The downlink tunnel is allocated by access node 12a. The downlink tunnel identifier/TEID 56 starts with the tunnel prefix "0x01" allocated to access node 12a.

Proxy node 16 lookups in downlink mapping table 26b for a downlink static mapping entry with a longest tunnel identifier prefix matching the tunnel identifier 56 in the TEID field of packet 132a. Alternatively, since there is no mobility event, proxy node 16 can look for a longest tunnel identifier prefix matching just TEID prefix 58a instead of the complete tunnel identifier 56. Proxy node 16 uses a downlink and not an uplink static mapping entry given that the packet is going in the downlink direction. Since proxy node 16 supports three access nodes, i.e., access nodes 12, exemplary downlink mapping table 26b includes three entries 130a, 130b and 130c, one for each tunnel prefix allocated to each access node. If instead of allocating just one tunnel prefix, two tunnel prefixes were allocated to each access node, then exemplary downlink mapping table 26b may include six entries.

Accordingly, a single downlink static mapping entry 130a in downlink mapping table 26b can represent all of the downlink tunnels between core node 14 and an access node 12a, given that all of the downlink tunnels between core node 14 and access node 12a have a TEID starting with tunnel prefix of "0x01." Similarly, downlink static mapping entry 130b refers to all downlink tunnels from core node 14 to access node 12b, as access node 12b was assigned the tunnel prefix "0x02" to use for the tunnel identifiers of all its downlink tunnels. Downlink static mapping entry 130c points to all tunnels having a tunnel prefix of "0x03," i.e., all downlink tunnels between core node 14 and target access node 12c.

Proxy node 16 determines which one of the three downlink mapping entries 130a, 130b and 130c has the longest tunnel identifier prefix matching the tunnel identifier/TEID 56 in the TEID field in order to determine which IP address to use when replacing the destination node address. Proxy node 16 selects an entry with the longest tunnel identifier prefix match, Alternatively, given that there is no handover procedure, proxy node 16 can select the entry matching just the tunnel prefix 58a.

Downlink static mapping entries 130a, 130b and 130c have previously been pre-configured during a network planning stage, so that each entry matches one of the tunnel prefixes allocated to access nodes 12 supported by proxy node 16. Proxy node 16 determines that downlink static mapping entry 130a has a longest tunnel identifier prefix "0x01" matching tunnel identifier/TEID 56, i.e., "0x01FFFFFF". Downlink static mapping entry 130a is the mapping entry that matches most of the tunnel identifier/TEID 56, i.e., most of the bits of tunnel identifier/TEID 56. As shown in downlink mapping table 26b, downlink static mapping entry 130a is associated with access node address 10.10.10.1. Downlink static mapping entry 130a specifies the action to be taken by proxy node 16 when the tunnel prefix "0x01," is the longest tunnel identifier prefix in downlink mapping table 26b that matches most of the matching criteria, i.e., the tunnel identifier/TEID 56 in packet 132a. The action associated with downlink static mapping entry 130a is for proxy node 16 to translate the destination IP address to the access node address 10.10.10.1, given that the tunnel prefix "0x01" was allocated to access node 12a.

Proxy node 16 replaces the proxy node address 10.20.20.20 in the destination IP address field with access node address 10.10.10.1 and, since the destination IP address field has changed, recomputes the IP checksum. Packet 132b shows the modifications that proxy node 16 made to packet 132a. Specifically, two fields were changed, the destination IP address field now includes access node address 10.10.10.1, and the IP checksum now includes the value of "30202." Proxy node 16 proceeds to forward packet 132b to access node 12a.

If proxy node 16 receives a downlink packet for access node 12b including a tunnel identifier/TEID 56 with a tunnel prefix 58a of "0x02," proxy node replaces the destination IP address to 10.10.10.2 as specified in downlink static mapping entry 130b. Similarly, if proxy node 16 would receives a downlink packet for target access node 12c including a tunnel identifier/TEID 56 including a tunnel prefix 58a of "0x03" in the tunnel identification field, proxy node 16 would determine that downlink static mapping entry 130c has the longest tunnel identifier prefix matching the "0x03" tunnel prefix in the tunnel identification field. Since the action associated with downlink static mapping entry 130c is to replace the destination IP address with 10.10.10.3, i.e., the access node address of target access node 12c, proxy node 16 would replace the 10.20.20.20 address in the destination IP address field with 10.10.10.3.

As such, the steps to forward a downlink unicast G-PDU packet from core node 14 to access node 12 when there is no mobility event, i.e., forwarding includes using a static and not a dynamic mapping entry, include: (1) selecting a mapping entry by performing the longest TEID prefix match on the TEID value (optionally, the UDP checksum may be verified prior to performing the longest TEID prefix match in order to ensure the integrity of the data in packet 132a); (2) replacing the destination IP address with the access node IP address provided by the mapping entry; (3) recomputing the IP header checksum based on the translated destination IP address; and (4) forwarding the GTP-U packet to the corresponding access node which can be a locally-connected node or a node connected over multiple IP hops.

Downlink G-PDU Packet Handling with Dynamic Mapping

FIG. 10 is a block diagram of exemplary proxy node 16 adding dynamic mapping entry 140 to the downlink mapping table 26b after handover is completed 136. For example, during a handover between access node 12a and target access node 12c, such as an X2 handover, access node 12a sends to target access node 12c handover preparation and execution messages 134. In a wireless communication area handling a large number of mobile subscribers where each subscriber mobile device 22 can move from access node 12a to another access node 12, such as target access node 12c, while maintaining GTP-U data transfer, handover procedures—such as X2 handover between pairs of GTP-U access nodes—may cause additional signaling load on the core network, i.e., core node 14.

For instance, during handover, access node 12a signals to target access node 12c to inform target access node 12c that access node 12a will no longer receive packets from core node 14 for subscriber mobile device 22, and instead, target access node 12c will start receiving packets from core node 14 for subscriber mobile device 22. Target access node 12c allocates a tunnel identifier/TEID 56 to receive traffic from core node 14. After a handover is completed between two GTP-U access nodes 12, i.e., access nodes 12a and 12c, a subscriber-associated signaling message 136, such as the S1 Path Switch Request in an S1 Application Protocol, is transmitted from target access node 12c to the GTP Control Plane Entity of the core network, i.e., to GTP Control Plane Entity 122 in core node 14. GTP Control Plane Entity 138 in target access node 12c informs GTP-U core node 14 to use a different TEID (and possible a different IP address) corresponding to the new entity, i.e., target access node 12c.

In such environment, it may be desirable to "hide/isolate" such handover procedures, such as the handover completion message 136, from the core network. For example, proxy node 16 can replace the destination IP address 10.20.20.20 and TEID "0x01FFFFFF" in downlink packet 132a when forwarding unicast G-PDU packet 132a to GTP-U target access node 12c currently hosting the subscriber session. The address translation is implemented using a downlink dynamic mapping entry 140 based at least in part on the destination IP address 10.20.20.20 located in the IP header and TEID "0x01FFFFFF" located in the GTP-U header of the original G-PDU packet 132*a*. A downlink dynamic mapping entry 140 can be automatically configured during handover to have as matching criteria the proxy node IP address 10.20.20.20 and the original TEID value "0x01FFFFFF" corresponding to a downlink tunnel from core node 14 to access node 12*a*.

Proxy node 16 determines that downlink dynamic mapping entry 140 has the longest tunnel identifier prefix matching the tunnel identifier/TEID 56 "0x01FFFFFF," in the tunnel identification field of packet 132*a*. Downlink dynamic mapping entry 140 may specify an action for proxy node 16, such as to translate the destination IP address in packet 132*a* to 10.10.10.3, and translate the TEID in packet 132*a* to "0x03FF01FF." Downlink dynamic mapping entry 140 is associated with the target node address, i.e., access node address 10.10.10.3 of target access node 12*c* and a target tunnel identifier "0x03FF01FF" corresponding to a downlink target tunnel between proxy node 16 and target access node 12*c*.

Proxy node 16 may replace the destination IP address 10.20.20.20 with the GTP-U access node IP address 10.10.10.3, and replacing the original TEID "0x01FFFFFF" with the new TEID value "0x03FF01FF." As such, downlink dynamic mapping entry 140 provides a temporary destination address and TEID translation mapping. Downlink dynamic mapping entry 140 eventually expires, i.e., times out. Downlink dynamic mapping entry 140 remains in a translation table, e.g., downlink mapping table 26*b* in mapping table 24, for as long as it is active, i.e., as long as the downlink dynamic mapping entry 140 is being used by G-PDU traffic. The downlink dynamic mapping entry 140 may be removed after being idle for a certain period of time.

A downlink dynamic mapping entry is not configured by a user. The downlink dynamic mapping entry 140 is added by proxy node 16 to downlink mapping table 26*b* in mapping table 24, based on activity of GTP-U Control Plane Entities 118 and 138. Specifically, a downlink dynamic mapping entry 140 is added when a specific subscriber-associated signaling message 136 is transmitted by target access node 12*c* to the core network, i.e., core node 14, after a handover is completed between a pair of GTP-U access nodes, e.g., access nodes 12*a* and 12*c*.

This signaling message 136, triggered by GTP-U target access node 12*c*, is intercepted by proxy node 16 using a light GTP-U Control Plane Entity 142 function. GTP-U Control Plane Entity 142 on proxy node 16 does not need to support all GTP-U control plane procedures required by access node 12 and core node 14. In one embodiment, GTP-U Control Plane Entity 142 is a light GTP-U Control Plane Entity. Proxy node 16 inspects the signaling messages originating from access node 12 but only needs to act on a small set of messages, like the S1 Path Switch Request. This aspect may simplify the design and capacity of GTP-U Control Plane Entity 142 on proxy node 16. The light GTP-U Control Plane Entity 142 function is responsible for adding a downlink dynamic mapping entry 140 with a full length TEID value "0x01FFFFFF" and a corresponding action. Such downlink dynamic mapping entries are added and removed as needed based on subscriber mobility in a wireless communication area, which usually represents a small portion of the total signaling load. The large portion of the downlink G-PDU traffic is still handled by the downlink static mapping entries.

The handover signaling procedure messages 134 between pairs of GTP-U access nodes 12*a* and 12*c*, and the handover completion message 136 between target access node 12*c* and proxy node 16 are extended to carry (i) the GTP-U access node IP address of access node 12*a*, i.e., 10.10.10.1, and (ii) the TEID of the original GTP-U downlink tunnel between core node 14 and access node 12*a*, i.e., "0x01FFFFFF." The handover operation is "hidden/isolated" from core node 14, as core node 14 does not receive the handover completion message 136. As such, core node 14 keeps sending messages to access node 12*a* that include TEID "0x01FFFFFF," and proxy node 16 keeps forwarding messages with TEID "0x01FFFFFF" to target access node 12*c*, after replacing the destination IP address and the TEID.

Proxy node 16 monitors user activity on each downlink dynamic mapping entry added. After an idle period which can be configurable and predetermined, downlink dynamic mapping entry 140 is removed from the proxy mapping table 24, and proxy node 16 informs the original GTP-U access node 12*a* that the original TEID "0x01FFFFFF" can now be re-used. The original GTP-U access node 12*a* may not re-allocate the original TEID to another subscriber, if a handover is performed to another GTP-U target access node 12*c*, until the original GTP-U access node 12*a* has received an indication or notification that the original TEID is no longer being used. This indication or notification can be carried over a separate control protocol.

Figure 11:
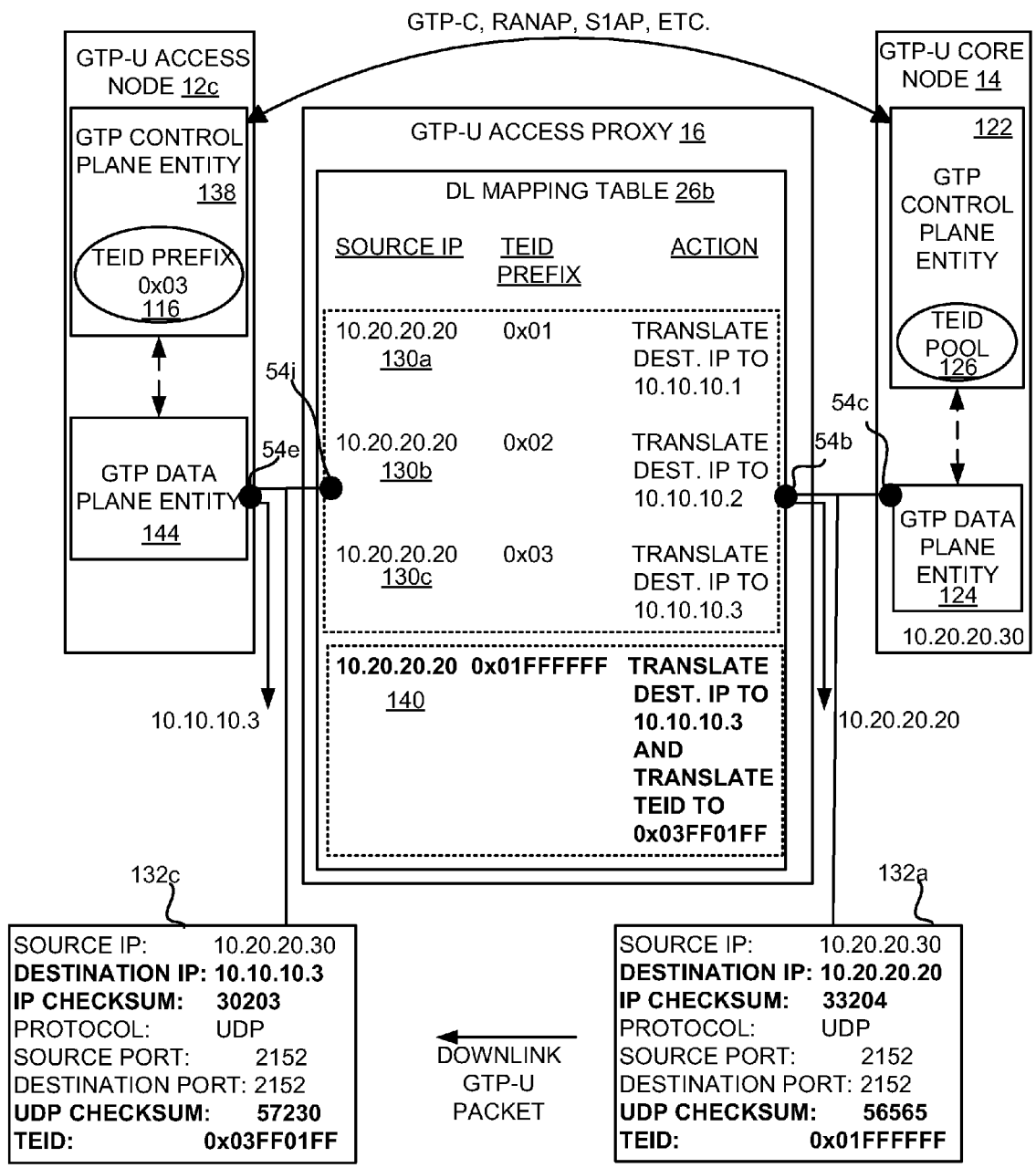
FIG. 11 is a block diagram of the exemplary system of FIG. 11 including details of an exemplary downlink packet transported after a mobility event constructed in accordance with the principles of the present invention.

FIG. 11 is a block diagram of exemplary proxy node 16 handling downlink packet 132*a* after a handover from access node 12*a* to target access node 12*c*. Downlink packet 132*a* received by proxy node 16 from core node 14 includes a source IP address field that includes IP address 10.20.20.30 corresponding to core node 14. The GTP-U header includes a TEID field with the value of "0x01FFFFFF," which represents a downlink tunnel between core node 14 and access node 12*a*. Proxy node 16 modifies packet 132*a* as specified in downlink dynamic mapping entry 140. Packet 132*c* shows the modifications made to packet 132*a*.

Specifically, proxy node 16 replaces the destination IP address 10.10.10.20 with target access node address 10.10.10.3, and the TEID with a tunnel identifier corresponding to a downlink target tunnel between proxy node 16 and target access node 12*c*, i.e., TEID "0x03FF01FF." Given that the IP header has changed to include the target node access address, the IP checksum is recomputed by proxy node 16. Packet 132*c* shows a new IP checksum value of "30203." Additionally, since the UDP payload has changed to include the target tunnel identifier, the UDP checksum is also recomputed. Packet 132*c* shows a new UDP checksum value of "57230." Proxy node 16 forwards packet 132*c* to target access node 12*c*. After the handover operation is complete, GTP Control Plane Entity 138 of target access node 12*c* communicates with GTP Control Plane Entity 122 of core node 14. Similarly, GTP Data Plane Entity 124 in core node 14 and GTP Data Plane Entity 144 in target access node 12*c* communicate with proxy node 16.

Accordingly, the following exemplary steps can be used to forward a unicast G-PDU packet to a GTP-U access node after a handover is completed: (1) a mapping entry is selected by performing a longest TEID prefix match on the TEID value. Optionally, the UDP checksum of packet 132*a* may be verified prior to performing the longest TEID prefix match to double check the integrity of packet 132*a*; (2) the destination IP address is replaced with the access node IP address provided by the mapping entry; (3) the IP header checksum is recomputed based on the translated destination IP address; (4) the original TEID value is replaced with the new TEID value provided by the mapping entry; (5) the UDP checksum is recomputed based on the translated TEID; and (6) the GTP-U packet is forwarded to the new GTP-U target access node 12*c* which can be a locally—connected node or a node connected over multiple IP hops.

Of note, while downlink static mapping entry 130a matches the "0x01" part of TEID "0x01FFFFFF," downlink dynamic mapping entry 140 matches the complete TEID, i.e., has the longest TEID prefix match of the "0x01FFFFFF" TEID value. In fact, TEID value "0x01FFFFFF" identifies a particular downlink tunnel between core node 14 and access node 12a, while "0x01" is the TEID prefix of all downlink tunnels between core node 14 and access node 12a. Downlink dynamic mapping entry 140 matches more bits (in this case all bits) of the original TEID than downlink static mapping entry 130a does.

Any entry in mapping table 24, e.g., a downlink static mapping entry, an uplink static mapping entry and a downlink dynamic mapping entry, can be associated with an action that proxy node 16 takes with respect to an incoming packet. Mapping table 24 may associate an entry with an action by, for example, including the action to be taken on the entry itself as shown in FIGS. 9, 10 and 11, or including a pointer on the entry that points to the action to be taken, among other forms of associating an action to a mapping entry.

Figure 12:
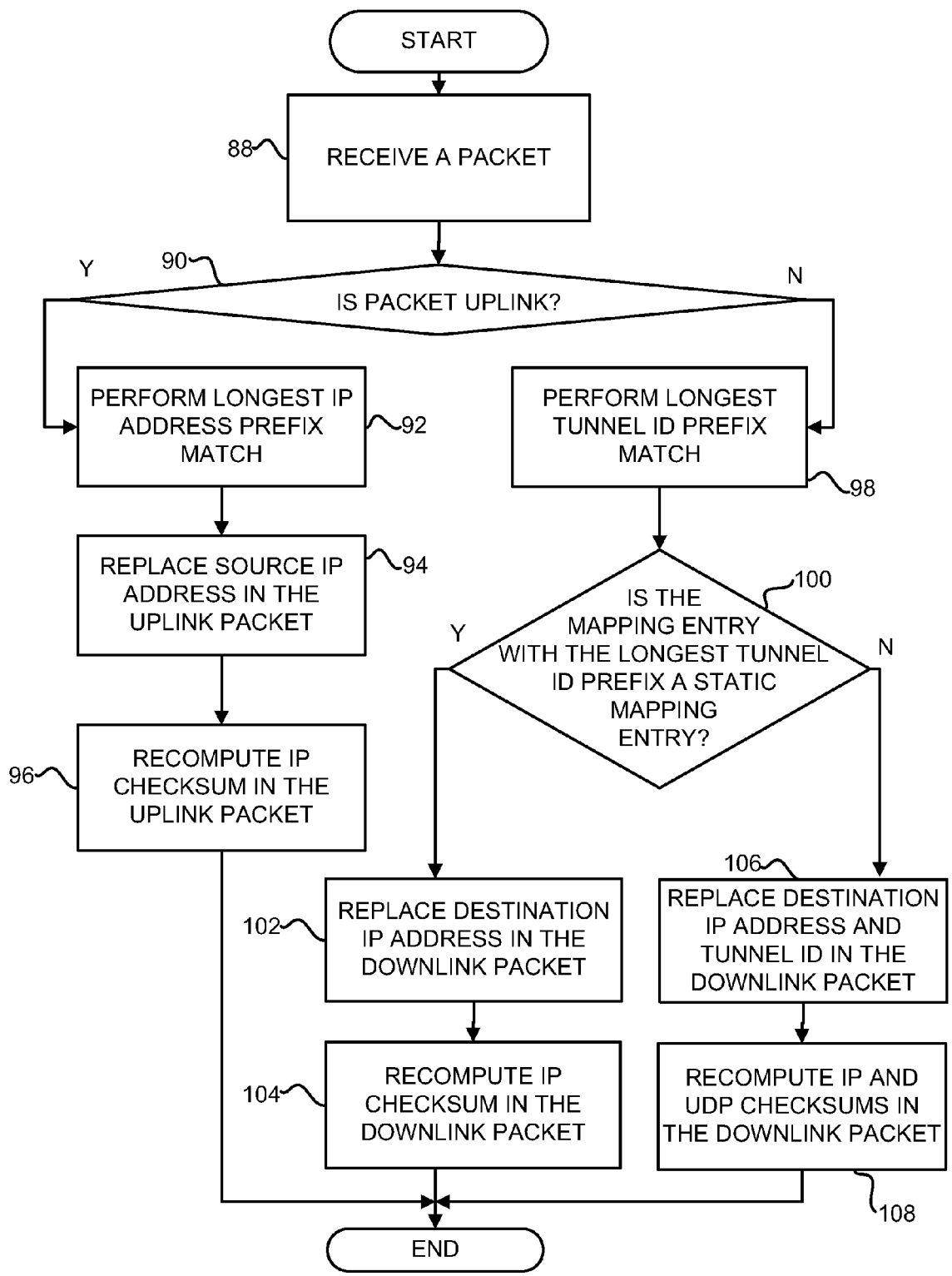
FIG. 12 is a flow chart of an exemplary process for transporting packets using a data plane function in accordance with the principles of the present invention.

FIG. 12 is a flowchart of an exemplary process for forwarding a packet using a Data Plane function. Proxy node 16 receives a packet (Block 88). The GTP data packet is received over a larger set of GTP data paths. Proxy node 16 determines whether the packet is uplink or downlink (Block 90). If the packet is uplink, GTP-U proxy node 16 performs a longest IP address prefix match (Block 92). Proxy node 16 selects an uplink static mapping entry based on the longest IP address prefix match identifying the most significant part of the source node IP address associated with the uplink packet. Proxy node 16 replaces the source IP address in the uplink packet with the proxy node address (Block 94) and recomputes the IP checksum in the uplink packet (Block 96).

In the downlink direction, i.e., when the packet is downlink, proxy node 16 performs a longest tunnel identification prefix match (Block 98). Proxy node 16 selects a downlink static or dynamic mapping entry based on the entry having the longest TEID prefix matching the TEID of the packet. Proxy node 16 determines whether the downlink mapping entry that matches the TEID is static or dynamic (Block 100). If the downlink mapping entry is static, proxy node 16 replaces the destination IP address in the downlink packet with the IP address of the access node associated with the TEID (Block 102), and recomputes the IP checksum in the downlink packet (Block 104). Else, if the downlink mapping entry is dynamic, proxy node 16 replaces the destination IP address with the IP address of the target access node associated with the downlink dynamic mapping entry. Proxy node 16 also replaces the tunnel identification with the target tunnel identification associated with the downlink dynamic mapping entry (Block 106). Proxy node 16 recomputes the IP and UDP checksums of the downlink packet (Block 108). The downlink packet is received over a smaller set of GTP data paths.

GTP-U Error Indication Handling

In another exemplary embodiment, proxy node 16 performs GTP-U Error Indication Handling. Each Error Indication message includes a TEID I information element and a GTP-U Peer Address information element in a UDP payload including the GTP-U header. An Error Indication may be assigned a message type value of "26." The message type may be carried in the GTP-U header. The Error Indication message may be sent in the uplink direction from access node 12 to core node 14 or in the downlink direction from core node 14 to access node 12. The 3GPP standard specifications specify that GTP-U Error indication messages are sent and received in TEID=0.

Proxy node 16 receives a GTP-U Error Indication message from access node 12. The uplink GTP-U Error Indication message includes in both the source IP address field and the Peer Address information element the IP address of access node 12. Proxy node 16 includes an uplink static mapping entry with a longest IP address prefix matching the access node address in the source IP address field of the Error Indication message. The uplink static mapping entry is associated with the proxy node address of proxy node 16 and includes an instruction to replace the source IP address field and the Peer Address information element with the proxy node address. Proxy node 16 selects the uplink static mapping entry and replaces both the source IP address field and the Peer Address information element with the proxy node address. For example, this uplink static mapping entry may be similar to uplink static mapping entry 110, with the addition of an action to replace the Peer Address information element as well.

As such, in an uplink direction the following steps may be performed in order to send a GTP-U Error Indication message from access node 12 to core node 14: (1) proxy node 16 selects an uplink static mapping entry by performing the longest IP address prefix match on the source IP address in the packet; (2) proxy node 16 replaces the source IP address with the proxy IP address provided by the mapping entry; (3) proxy node 16 recomputes the IP header checksum based on the translated source IP address; (4) proxy node 16 replaces the IP address in the GTP-U Peer Address information element with the IP address provided by the uplink mapping entry, i.e., the proxy node IP address; (5) proxy node 16 recomputes the UDP checksum based on the translated GTP-U Peer Address; and (6) proxy node 16 forwards the GTP-U Error Indication message to GTP-U core node 14, which can be a locally-connected node or a node connected over multiple IP hops In another exemplary embodiment, a downlink GTP-U Error indication message from core node 14 to one of access nodes 12 is received by proxy node 16. The downlink GTP-U Error indication message includes the proxy node address in the destination IP address field and the core node address in the Peer Address information element. Proxy node 16 does not know which access node 12 to forward the downlink GTP-U Error indication message to. As such, proxy node 16 selects all downlink mapping entries and forwards the downlink GTP-U Error indication message to all access nodes proxy node 16 supports, i.e., to access nodes 12.

Mapping table 24 in proxy node 16 includes downlink static mapping entries corresponding to all access nodes supported by proxy node 16, such as a downlink static mapping entry 130a, 130b and 130c corresponding to access nodes addresses 10.10.10.1, 10.10.10.2 and 10.10.10.3. The downlink static mapping entries are associated with the proxy node address and include instructions to replace the proxy node address in the destination IP address field with an access node address.

Accordingly, proxy node 16 performs the following process to send a GTP-U Error Indication message in the downlink direction from GTP-U core node 14 to a GTP-U access node: (1) all static downlink mapping entries corresponding to the destination IP address located in the IP header of the GTP-U Error Indication message are selected; (2) before forwarding the GTP-U Error Indication message to each GTP-U access node 12, the destination IP address 10.20.20.20 is replaced with the access node IP addresses provided by each mapping entry, i.e., the addresses 10.10.10.1, 10.10.10.2 or 10.10.10.3; (3) the IP header checksum is recomputed based on the translated destination IP address; and (4) the message is multicasted to the GTP-U access nodes 12 provided by the mapping entries.

GTP-U Echo Handling

In another exemplary embodiment, proxy node 16 processes GTP-U Echo Requests and Responses. As specified in the 3GPP standard specifications, GTP-U Echo Requests and Responses are sent and received in TEID=0. An Echo Request may be assigned a message type value of "1." An Echo Response may be assigned a message type value of "2." The message type is carried in the GTP-U header. Proxy node 16 listens for incoming Echo Requests originating from the core network, i.e., core node 14, and transmits a GTP-U Echo Response to core node 14 in response to each GTP-U Echo Request destined to its GTP-U interface 54b.

Additionally, proxy node 16 listens for incoming Echo Requests originating from each access node 12. Proxy node 16 receives an Echo Request from access node 12 to core node 14, but does not relay the Echo Request to core node 14. Instead, proxy node 16 terminates the Echo Request and transmits a GTP-U Echo Response in response to each GTP-U Echo Request destined to a GTP-U core node 14. Proxy node 16 transmits the GTP-U Echo Response once proxy node 16 is able to verify the connectivity to that GTP-U core node 14 using its own set of Echo Request messages. Proxy node 16 stops responding to Echo Requests originating from a GTP-U access node when it detects a path failure to the specified GTP-U core node. Proxy node 16 uses the destination IP address (10.20.20.30) of the Echo Request as the source IP address of the Echo Response transmitted to a GTP-U access node.

The arrangements described herein may include an effective distribution of GTP-U traffic across several locally or remotely connected GTP-U access nodes based on a reduced set of uplink and downlink static mapping entries. The reduced set of uplink and downlink static mapping entries may allow effective table lookup operations regardless of the number of existing GTP-U tunnels. For example, a single downlink static mapping entry that includes tunnel prefix "0x01" can be used to represent all downlink tunnels between core node 14 and access node 12a. Similarly, a single uplink static mapping entry 10.10.10.0/29 can be used to represent all access nodes 12a, 12b and 12c supported by proxy node 16.

The reduced set of static mapping entries may result in simple translation functions and simpler mapping table management without requiring proxy node 16 to support a full GTP Control Plane Entity and associated signaling protocol, thus increasing the scalability, performance and ease of deployment of proxy node 16. The arrangements described herein may cause a reduction in handover signaling traffic between the wireless communication area and the core network since subscriber mobility is handled locally within the wireless communication area without the need to involve the core nodes. Further, a reduction in the number of GTP-U paths to deploy and monitor between a wireless communication area and the core network may be experienced. Critical GTP-U signaling procedures such as echoes and error indications are supported with transparency between the wireless communication area and core network. The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a node or a card in a node, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for transporting a plurality of packets between an access node and a core node via a proxy node, the access node having an access node address, the core node having a core node address, and the proxy node having a proxy node address, the method comprising:
   receiving, from the access node, a first packet of the plurality of packets for transmission to the core node, the first packet comprising:
      a first source address field including the access node address; and
      a first destination address field including the core node address; and
      an error indication message comprising a peer address; and
   selecting an uplink static mapping entry, the uplink static mapping entry including a value indicating a number of bits of the access node address to match with the uplink static mapping entry, the selected uplink static mapping entry having a longest address prefix matching the access node address in the first source address field, the uplink static mapping entry being associated with the proxy node address;
   replacing the access node address in the first source address field with the proxy node address associated with the uplink static mapping entry;
   replacing the peer address with the proxy node address associated with the uplink static mapping entry; and
   forwarding the first packet to the core node.

2. The method of claim 1, further comprising:
   receiving, from the core node, a second packet of the plurality of packets for transmission to the access node, the second packet comprising:
      a second source address field including the core node address;
      a second destination address field including the proxy node address; and
      a tunnel identification field including a tunnel identifier comprising a predefined static identifier tunnel prefix, the tunnel identifier identifying a downlink tunnel between the core node and the access node;
   selecting a downlink static mapping entry with a longest tunnel identifier prefix matching the tunnel identifier in the tunnel identification field, the downlink static mapping entry being associated with the access node address; and replacing the proxy node address in the second destination address field with the access node address associated with the downlink static mapping entry.

3. The method of claim 2, further comprising:

computing a first checksum of an IP header in the first packet, the IP header including the first source address field including the proxy node address associated with the uplink static mapping entry;

computing a second checksum of the IP header in the second packet, the IP header including the second destination address field including the access node address associated with the downlink static mapping entry; and forwarding the second packet to the access node.

4. The method of claim 2, further comprising:

receiving a message indicating that the access node has completed a handover process to a target access node having a target node address;

selecting a downlink dynamic mapping entry with a longest tunnel identifier prefix matching the tunnel identifier stored in the tunnel identification field, the downlink dynamic mapping entry being associated with the target node address and a target tunnel identifier corresponding to a downlink target tunnel between the proxy node and the target access node;

replacing the proxy node address in the second destination address field with the target node address associated with the downlink dynamic mapping entry; and replacing the tunnel identifier in the tunnel identification field with the target tunnel identifier associated with the downlink dynamic mapping entry.

5. The method of claim 4, the method further comprising:

computing a second checksum of an IP header in the second packet, the IP header including the second destination address field including the target node identifier associated with the downlink dynamic mapping entry;

computing a User Datagram Protocol, UDP, checksum in a checksum field of an UDP header in the second packet, wherein a UDP payload field in the second packet includes a General Packet Radio Service Tunneling Protocol User Plane, GTP-U, header including the target tunnel identifier associated with the downlink dynamic mapping entry; and forwarding the second packet to the target access node.

6. The method of claim 4, the method further comprising:

storing in the proxy node an uplink mapping table and a downlink mapping table, the uplink mapping table including:

a plurality of uplink static mapping entries, the plurality of uplink static mapping entries including the uplink static mapping entry associated with the proxy node address; and the downlink mapping table including:

a plurality of downlink static mapping entries, the plurality of downlink static mapping entries including the downlink static mapping entry associated with the access node address; and a plurality of downlink dynamic mapping entries including the downlink dynamic mapping entry associated with the target node address and the target tunnel identifier, and the method further comprising:

adding the downlink dynamic mapping entry to the downlink mapping table after the handover process is completed.

7. The method of claim 6, wherein the access node is one of a plurality of access nodes in communication with the proxy node, each of the plurality of access nodes being allocated a different one of a plurality of predefined static identifier tunnel prefixes, the plurality of predefined static identifier tunnel prefixes including the predefined static identifier tunnel prefix allocated to the access node, and wherein a plurality of tunnels between the access node and the core node include:

a plurality of uplink tunnels between the access node and the core node, the plurality of uplink tunnels being unidirectional and being allocated by the core node; and a plurality of downlink tunnels between the core node and the access node, the plurality of downlink tunnels being unidirectional and being allocated by the access node, the plurality of downlink tunnels including the downlink tunnel between the core node and the access node; and wherein each of the plurality of downlink tunnels is identified by one of a plurality of tunnel identifiers, the plurality of tunnel identifiers including the tunnel identifier, each of the plurality of tunnel identifiers comprising the predefined static identifier tunnel prefix allocated to the access node; and wherein a count of the plurality of uplink and downlink static mapping entries in the uplink and downlink mapping table is less than a count of a plurality of tunnels between the plurality of access nodes and the core node.

8. The method of claim 1, further comprising:

computing a first checksum of an IP header in the first packet, the IP header including the first source address field including the proxy node address associated with the uplink static mapping entry; and computing a User Datagram Protocol, UDP, checksum in a checksum field of an UDP header in the first packet, wherein a UDP payload field in the first packet includes a General Packet Radio Service Tunneling Protocol User Plane, GTP-U, header including the proxy node address associated with the uplink static mapping entry.

9. The method of claim 1, further comprising:

receiving a third packet from the core node, the third packet comprising:

a third destination address field including the proxy node address;

an error indication message comprising a peer address;

selecting all of a plurality of downlink static mapping entries in a downlink mapping table, wherein all of the plurality of downlink static mapping entries correspond to the proxy node address in the third destination address field;

computing a third checksum of the IP header in the third packet, the IP header including the third destination address field including the access node address of the access node, the access node being associated with one of all of the plurality of downlink static mapping entries; and multicasting the third packet to a plurality of access nodes including the access node, each access node of the plurality of access nodes being associated with a different one of all of the plurality of downlink static mapping entries.

10. The method of claim 1, further comprising:

receiving a first echo request from the access node, the first echo request being addressed to the core node;

terminating the first echo request without transmitting the first echo request to the core node;

transmitting, by the proxy node in response to receiving the first echo request, a second echo request to the core node;

if the proxy node receives from the core node a second echo response to the second echo request:
   then transmitting a first echo response to the access node, the first echo response including a fourth source address field including the core node address;
else, ignoring the first echo request from the access node.

11. The method of claim 10, further comprising:
   receiving a third echo request from the core node addressed to the proxy node; and
   transmitting in response to receiving the third echo request, a third echo response to the core node.

12. A proxy node having a proxy node address, the proxy node configured to route a plurality of packets between an access node and a core node, the access node having an access node address and the core node having a core node address, the proxy node comprising:
   a receiver, the receiver configured to receive from the access node, a first packet of the plurality of packets for transmission to the core node, the first packet comprising:
      a first source address field including the access node address; and
      a first destination address field including the core node address; and
   a processor in communication with the receiver, the processor configured to:
      select an uplink static mapping entry, the uplink static mapping entry including a value indicating a number of bits of the access node address to match with the uplink static mapping entry, the selected uplink static mapping entry having a longest address prefix matching the access node address in the first source address field, the uplink static mapping entry being associated with the proxy node address; and
      replace the access node address in the first source address field with the proxy node address associated with the uplink static mapping entry;
   a transmitter in communication with the receiver and the processor, the first packet further including an error indication message comprising a peer address;
   the processor being further configured to replace the peer address with the proxy node address associated with the uplink static mapping entry; and
   the transmitter configured to forward the first packet to the core node.

13. The proxy node of claim 12, wherein the processor is further configured to:
   receive, from the core node, a second packet of the plurality of packets for transmission to the access node, the second packet comprising:
      a second source address field including the core node address;
      a second destination address field including the proxy node address; and
      a tunnel identification field including a tunnel identifier comprising a predefined static identifier tunnel prefix, the tunnel identifier identifying a downlink tunnel between the core node and the access node;
   select a downlink static mapping entry matching the predefined static identifier tunnel prefix of the tunnel identifier in the tunnel identification field, the downlink static mapping entry being associated with the access node address; and
   replace the proxy node address in the second destination address field with the access node address associated with the downlink static mapping entry.

14. The proxy node of claim 13, wherein the processor is further configured to:
   compute a first checksum of an IP header in the first packet, the IP header including the first source address field including the proxy node address associated with the uplink static mapping entry; and
   compute a second checksum of the IP header in the second packet, the IP header including the second destination address field including the access node address associated with the downlink static mapping entry; and
   the transmitter configured to:
      forward the second packet to the access node.

15. The proxy node of claim 13, wherein the receiver is further configured to:
   receive a message indicating that the access node has completed a handover process to a target access node having a target node address; and
   the processor is further configured to:
      select a downlink dynamic mapping entry matching the tunnel identifier stored in the tunnel identification field, the downlink dynamic mapping entry being associated with the target node address and a target tunnel identifier corresponding to a downlink target tunnel between the proxy node and the target access node;
      replace the proxy node address in the second destination address field with the target node address associated with the downlink dynamic mapping entry; and
      replace the tunnel identifier in the tunnel identification field with the target tunnel identifier associated with the downlink dynamic mapping entry.

16. The proxy node of claim 15, wherein the processor is further configured to:
   compute a second checksum of an IP header in the second packet, the IP header including the second destination address field including the target node identifier associated with the downlink dynamic mapping entry; and
   compute a User Datagram Protocol, UDP, checksum in a checksum field of an UDP header in the second packet, wherein a UDP payload field in the second packet includes a General Packet Radio Service Tunneling Protocol User Plane, GTP-U, header including the target tunnel identifier associated with the downlink dynamic mapping entry; and
   the transmitter configured to forward the second packet to the target access node.

17. The proxy node of claim 15, the proxy node further comprising:
   a memory in communication with the receiver and the processor, the memory configured to store an uplink mapping table and a downlink mapping table, the uplink mapping table including:
      a plurality of uplink static mapping entries, the plurality of uplink static mapping entries including the uplink static mapping entry associated with the proxy node address; and
   the downlink mapping table including:
      a plurality of downlink static mapping entries, the plurality of downlink static mapping entries including the downlink static mapping entry associated with the access node address; and
      a plurality of downlink dynamic mapping entries including the downlink dynamic mapping entry associated with the target node address and the target tunnel identifier; and wherein the processor is further configured to:
add the downlink dynamic mapping entry to the downlink mapping table after the handover process is completed.

18. The proxy node of claim 17, wherein the access node is one of a plurality of access nodes in communication with the proxy node, each of the plurality of access nodes being allocated a different one of a plurality of predefined static identifier tunnel prefixes, the plurality of predefined static identifier tunnel prefixes including the predefined static identifier tunnel prefix allocated to the access node, and wherein a plurality of tunnels between the access node and the core node include:
a plurality of uplink tunnels between the access node and the core node, the plurality of uplink tunnels being unidirectional and being allocated by the core node; and
a plurality of downlink tunnels between the core node and the access node, the plurality of downlink tunnels being unidirectional and being allocated by the access node, the plurality of downlink tunnels including the downlink tunnel between the core node and the access node;
wherein each of the plurality of downlink tunnels is identified by one of a plurality of tunnel identifiers, the plurality of tunnel identifiers including the tunnel identifier, each of the plurality of tunnel identifiers comprising the predefined static identifier tunnel prefix; and
wherein a count of the plurality of uplink and downlink static mapping entries in the uplink and downlink mapping table is less than a count of a plurality of tunnels between the plurality of access nodes and the core node.

19. The proxy node of claim 12, wherein the receiver is further configured to:
receive a third packet from the core node, the third packet comprising:
a third destination address field including the proxy node address;
an error indication message comprising a peer address; and the processor is further configured to:
select all of a plurality of downlink static mapping entries in a downlink mapping table, wherein all of the plurality of downlink static mapping entries correspond to the proxy node address in the third destination address field; and
the transmitter is further configured to multicast the third packet to a plurality of access nodes including the access node, each access node of the plurality of access nodes being associated with one of all of the plurality of downlink static mapping entries.

20. The proxy node of claim 12, wherein the receiver is further configured to:
receive a first echo request from the access node, the first echo request being addressed to the core node;
the processor is further configured to:
terminate the first echo request without transmitting the first echo request to the core node
the transmitter configured to:
transmit, in response to receiving the first echo request, a second echo request to the core node;
if the receiver receives from the core node a second echo response to the second echo request, then the transmitter is further configured to transmit a first echo response to the access node, the first echo response including a fourth source address field including the core node address;
else, the processor is further configured to ignore the echo request from the access node.

21. The proxy node of claim 20, wherein the receiver is further configured to:
receive a third echo request from the core node addressed to the proxy node; and
the transmitter is further configured to transmit, in response to receiving the third echo request, a third echo response to the core node.

22. A network communication system for transporting a plurality of packets, the network system comprising:
an access node having an access node address, the access node including an access node transmitter;
a core node having a core node address, the core node including a core node receiver; and
a proxy node in communication with the access node and the core node, the proxy node having a proxy node address, the proxy node including:
a proxy node receiver;
a proxy node processor in communication with the proxy node receiver; and
a proxy node transmitter in communication with the proxy node receiver and the proxy node processor;
the access node transmitter is configured to transmit an uplink packet of the plurality of packets to the proxy node, the uplink packet comprising:
a source address field including the access node address; and
a destination address field including the core node address;
the proxy node receiver is configured to receive the uplink packet for transmission to the core node, the proxy node processor configured to:
select an uplink static mapping entry, the uplink static mapping entry including a value indicating a number of bits of the access node address to match with the uplink static mapping entry, the selected uplink static mapping entry having a longest address prefix matching the access node address in the source address field, the uplink static mapping entry being associated with the proxy node address;
replace the access node address in the first source address field with the proxy node address associated with the uplink static mapping entry; and
the proxy node transmitter is configured to transmit the uplink packet to the core node;
the core node receiver is configured to receive the uplink packet from the proxy node; and
the core node further includes a core node transmitter configured to:
transmit a downlink packet of the plurality of packets to the proxy node, the downlink packet comprising:
a source address field including the core node address; and
a destination address field including the proxy node address;
a tunnel identification field including a tunnel identifier comprising a predefined static identifier tunnel prefix, the tunnel identifier identifying a downlink tunnel between the core node and the access node;
the proxy node receiver being further configured to:
receive the downlink packet for transmission to the access node;
if the proxy node receiver receives a message indicating that the access node has completed a handover process to a target access node having a target node address:
then the proxy node processor is further configured to:
select a downlink dynamic mapping entry with a longest tunnel identifier prefix matching the tunnel identifier stored in the tunnel identification field, the downlink dynamic mapping entry being associated with the target node address and a target tunnel identifier corresponding to a downlink target tunnel between the proxy node and the target access node;

replace the proxy node address in the destination address field with the target node address associated with the downlink dynamic mapping entry; and replace the tunnel identifier in the tunnel identification field with the target tunnel identifier associated with the downlink dynamic mapping entry;

else:

the proxy node processor is further configured to:

select a downlink static mapping entry with a longest tunnel identifier prefix matching the tunnel identifier in the tunnel identification field, the downlink static mapping entry being associated with the access node address; and replace the proxy node address in the destination address field with the access node address associated with the downlink static mapping entry.

* * * * *